(12) United States Patent
Wang et al.

(10) Patent No.: US 10,701,400 B2
(45) Date of Patent: Jun. 30, 2020

(54) SIGNALLING OF SUMMARIZING VIDEO SUPPLEMENTAL INFORMATION

(71) Applicant: QUALCOMM Incorporated, San Diego, CA (US)

(72) Inventors: YeKui Wang, San Diego, CA (US); Thomas Stockhammer, Bergen (DE)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 15/926,833

(22) Filed: Mar. 20, 2018

(65) Prior Publication Data

US 2018/0278964 A1 Sep. 27, 2018

Related U.S. Application Data

(60) Provisional application No. 62/474,540, filed on Mar. 21, 2017.

(51) Int. Cl.
*H04N 19/70* (2014.01)
*H04N 19/46* (2014.01)
*H04N 21/6332* (2011.01)
*H04N 21/854* (2011.01)

(52) U.S. Cl.
CPC ............. *H04N 19/70* (2014.11); *H04N 19/46* (2014.11); *H04N 21/6332* (2013.01); *H04N 21/85406* (2013.01)

(58) Field of Classification Search
CPC ...... H04N 19/46; H04N 19/70; H04N 19/597; H04N 21/2342; H04N 21/2343; H04N 21/2362; H04N 21/6332; H04N 21/85606
See application file for complete search history.

(56) References Cited

U.S. PATENT DOCUMENTS

| | | | | |
|---|---|---|---|---|
| 2004/0006575 | A1* | 1/2004 | Visharam | H04N 21/23424 |
| 2010/0049865 | A1* | 2/2010 | Hannuksela | H04N 21/234327 709/231 |
| 2014/0049603 | A1* | 2/2014 | Wang | H04N 19/597 348/43 |
| 2016/0337670 | A1* | 11/2016 | Suh | H04N 19/597 |

FOREIGN PATENT DOCUMENTS

WO 2014047204 A1 3/2014

OTHER PUBLICATIONS

Frajdh P., et al., "File Format Video Requirements," 90 MPEG Meeting, Oct.26, 2009-Oct. 30, 2009, XIAN, (Motion Picture Expert Group or ISO/IEC JTC1/SC29/WG11), No. M16979, Oct. 23, 2009, XP030045569, 5 Pages.

(Continued)

*Primary Examiner* — Tracy Y. Li
(74) *Attorney, Agent, or Firm* — Shumaker & Sieffert, P.A.

(57) ABSTRACT

In various implementations, provided are techniques, as well as systems that implement these techniques, for SEI messages that distinguish "essential" information from "non-essential" information. In various implementations, an encoder can be configured to determine whether information associated with video data is essential or is not essential. In various implementations, different types of SEI messages can be defined, where one or more of these types of SEI messages can indicate whether information associated with a particular video is essential or not essential. Essential information is required for presenting the video data, and is not required for decoding the video data.

30 Claims, 10 Drawing Sheets

(56) References Cited

OTHER PUBLICATIONS

International Search Report and Written Opinion—PCT/US2018/023598—ISA/EPO—dated Jun. 6, 2018.
Wang Y-K., et al., "14496-15: Exposing Important Information in Sample Entry and the Codecs Parameter" 117 MPEG Meeting, Jan. 16, 2017-Jan. 20, 2017, Geneva, (Motion Picture Expert Group or SO/IEC JTC1/SC29/WG11), No. M39984, Jan. 11, 2017, XP030068329, 2 Pages.
3GPP TS 26.244 V12.2.0, 3rd Generation Partnership Project; Technical Specification Group Services and System Aspects; Transparent end-to-end packet switched streaming service (PSS); 3GPP file format (3GP), (Release 12), Dec. 2013, 61 pp.
Anonymous: "Text of ISO/IEC 14496-15 2nd edition", Information technology—Coding of Audio-Visual Objects—Part 15: Advanced Video Coding (AVC) File Format, 91 MPEG Meeting; Jan. 18, 2010-Jan. 22, 2010; Kyoto; (Motion Picture Expertgroup or ISO/IEC JTC1/SC29/WG11) No. N11139, Jan. 22, 2010 (Jan. 22, 2010), XP030017636, ISSN: 0000-0030 the whole document, 95 pages.

Boyce J., et al., "HEVC Additional Supplemental Enhancement Information (Draft 1)", Joint Collaborative Team on Video Coding (JCT -VC) of ITU-T SG 16 WP 3 and ISO/IEC JTC 1/SC 29/WG 11, 26th Meeting, Geneva, Jan. 12-20, 2017, pp. 1-19, JCTVC-Z1005.
International Preliminary Report on Patentability—PCT/US2018/023598, The International Bureau of WIPO—Geneva, Switzerland, dated Sep. 24, 2019.
International Standard., "Information Technology—Dynamic Adaptive Streaming over HTTP (DASH)—Part 1: Media Presentation Description and Segment Formats", MPEG Meeting;Oct. 19, 2015-Oct. 23, 2015; Geneva; (Motion Picture Expert Group or ISO/IEC JTC1/SC29/WG11), No. N15686, ISO/IEC 23009-1, Third Edition, XP030022374, Dec. 8, 2015, pp. 1-184.
International Standard ISO/IEC 14496-12, Information Technology—Coding of audio-visual objects —Part 12: ISO base media tile format, Third Edition, Oct. 15, 2008, 120 pp.

\* cited by examiner

800

Receiving, at a decoding device, an encoded video bitstream, a supplemental enhancement information (SEI) message, and information associated with the encoded video bitstream
802

Determining using the SEI message, whether the information is required to present video data in the encoded video bitstream, wherein the information is not required for decoding the video data, and wherein the SEI message includes a field indicating whether the information is required to present the video data
804

Decoding the encoded video bitstream to produce video data, wherein the encoded video bitstream is decoded according to a result of determining whether the information is required to present the video data
806

FIG. 8

SIGNALLING OF SUMMARIZING VIDEO SUPPLEMENTAL INFORMATION

CROSS-REFERENCES TO RELATED APPLICATIONS

This application claims priority to U.S. Provisional Application No. 62/474,540, filed on Mar. 21, 2017, which is incorporated herein by reference in its entirety.

FIELD

This application is generally related to video coding. For example, systems and methods are described for encoding and decoding of supplemental enhancement information

BACKGROUND

Video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 or ISO/IEC MPEG-4 AVC, including its Scalable Video Coding (SVC) and Multiview Video Coding (MVC) extensions, and High-Efficiency Video Coding (HEVC), also known as ITU-T H.265 and ISO/IEC 23008-2, including its scalable coding extension (i.e., scalable high-efficiency video coding, SHVC) and multiview extension (i.e., multiview high efficiency video coding, MV-HEVC).

BRIEF SUMMARY

In various implementations, provided are techniques for signaling essential information in SEI messages. Information is essential when an encoder determines that the information is required for displaying video data. The information is not required for decoding the video data. Information related to displaying or presenting video data can be provided in SEI messages, however, the SEI messages may not be able to indicate whether the data carried in each message is or is not essential to the presentation of the video data. Additionally, coding standards that use SEI messages may not provide a way for decoding devices to quickly identify and locate SEI messages that include essential information.

In various implementations, provided are SEI messages that can indicate that essential information is included with an encoded video bitstream. These SEI messages enable a decoding device to determine that essential information is provided, and to locate the essential information.

According to at least one example, a method of encoding video data is provided that includes receiving video data. The method further includes determining, by an encoding device, whether information associated with the video data is required to present the video data, wherein the information is not required for decoding the video data. The method further includes generating a supplemental enhancement information (SEI) message, wherein the SEI message includes a field indicating whether the information is required to present the video data. The method further includes encoding the video data. The method further includes including the SEI message with the encoded video data.

In another example, an encoding is provided that includes a memory configured to store video data and a processor. The processor is configured to and can determine whether information associated with the video data is required to present the video data, wherein the information is not required for decoding the video data. The processor is configured to and can generate a supplemental enhancement information (SEI) message, wherein the SEI message includes a field indicating whether the information is required to present the video data. The processor is configured to and can encode the video data. The processor is configured to and can include the SEI message with the encoded video data.

In another example, a non-transitory computer-readable medium is provided comprising instructions that, when executed by one or more processors, cause the one or more processors to receive video data. The instructions further cause the one or more processors to determine whether information associated with the video data is required to present the video data, wherein the information is not required for decoding the video data. The instructions further cause the one or more processors to generate a supplemental enhancement information (SEI) message, wherein the SEI message includes a field indicating whether the information is required to present the video data. The instructions further cause the one or more processors to encode the video data. The instructions further cause the one or more processors to include the SEI message with the encoded video data.

In another example, an apparatus is provided that includes means for receiving video data. The apparatus further comprises means for determining whether information associated with the video data is required to present the video data, wherein the information is not required for decoding the video data. The apparatus further comprises means for generating a supplemental enhancement information (SEI) message, wherein the SEI message includes a field indicating whether the information is required to present the video data. The apparatus further comprises means for encoding the video data. The apparatus further comprises means for including the SEI message with the encoded video data.

In some aspects, the encoding device is configured with one or more parameters the encoding device can use to determine whether the information is required to present the video data.

In some aspects, the encoding device determines that the information is required to present the video data.

In some aspects, the encoding device determines that the information is not required to present the video data.

In some aspects, a syntax element of the SEI message indicates a type of the SEI message.

In some aspects, the information is included with the encoded video data.

In some aspects, the methods, apparatuses, and computer readable medium described above further comprise writing the encoded video data and the SEI message to a file, wherein the encoded video data and the SEI message are written to the file according to a file format. The aspects further comprise using the file format to place the SEI message in the file where the SEI can be read before the encoded video data is read.

In some aspects, the methods, apparatuses, and computer readable medium described above further comprise encapsulating the encoded video data for streaming, wherein the encoded video data is encapsulated according to a streaming format. These aspects further comprise generating, according to the streaming format, a description of encoded video data, wherein the description includes the SEI message.

In some aspects, the methods, apparatuses, and computer readable medium described above further comprise encapsulating the encoded video data for transmission over a network, wherein the encoded video data is encapsulated according to a container format. These aspects further comprise generating, according to the container format, a first packet, wherein a payload portion of the first packet includes the SEI message as a descriptor. These aspects further comprise generating one or more packets including the encoded video data, wherein the one or more packets follow the first packet in transmission order.

In some aspects, the methods, apparatuses, and computer readable medium described above further comprise encapsulating the encoded video data for transmission over a network, wherein the encoded video data is encapsulated according to a real-time transfer protocol. These aspects further comprise generating, according to a session description protocol, a session description, wherein the session description includes the SEI message.

According to at least one example, a method of decoding video data is provided that includes receiving, at a decoding device, an encoded video bitstream, a supplemental enhancement information (SEI) message, and information associated with the encoded video bitstream. The method further includes determining using the SEI message, whether the information is required to present video data in the encoded video bitstream, wherein the information is not required for decoding the video data, and wherein the SEI message includes a field indicating whether the information is required to present the video data. The method further includes decoding the encoded video bitstream to produce video data, wherein the encoded video bitstream is decoded according to a result of determining whether the information is required to present the video data.

In another example, an apparatus is provided that includes a memory configured to store encoded video data, a supplemental enhancement information (SEI) message, and information associated with the encoded video bitstream, and a processor. The processor is configured to and can determine using the SEI message, whether the information is required to present video data in the encoded video bitstream, wherein the information is not required for decoding the video data, and wherein the SEI message includes a field indicating whether the information is required to present the video data. The processor is configured to and can decode the encoded video bitstream to produce video data, wherein the encoded video bitstream is decoded according to a result of determining whether the information is required to present the video data.

In another example, a non-transitory computer-readable medium is provided comprising instructions that, when executed by one or more processors, cause the one or more processors to receive an encoded video bitstream, a supplemental enhancement information (SEI) message, and information associated with the encoded video bitstream. The instructions further cause the one or more processors to determine using the SEI message, whether the information is required to present video data in the encoded video bitstream, wherein the information is not required for decoding the video data, and wherein the SEI message includes a field indicating whether the information is required to present the video data. The instructions further cause the one or more processors to decode the encoded video bitstream to produce video data, wherein the encoded video bitstream is decoded according to a result of determining whether the information is required to present the video data.

In another example, an apparatus is provided that includes means for receiving an encoded video bitstream, a supplemental enhancement information (SEI) message, and information associated with the encoded video bitstream. The apparatus further comprises means for determining using the SEI message, whether the information is required to present video data in the encoded video bitstream, wherein the information is not required for decoding the video data, and wherein the SEI message includes a field indicating whether the information is required to present the video data. The apparatus further comprises means for decoding the encoded video bitstream to produce video data, wherein the encoded video bitstream is decoded according to a result of determining whether the information is required to present the video data.

In some aspects, the decoding device determines that the information is required to present the video data, and wherein the decoding device configures the video data according to the information.

In some aspects, the decoding device determines that the information is not required to present the video data, and wherein the decoding device decodes the encoded video data without using the information.

In some aspects, a syntax element of the SEI message indicates a type of the SEI message.

In some aspects, the encoded video bitstream, the SEI message, and the information associated with the encoded video bitstream are received in a file, wherein the file is formatted according to a file format, and wherein, according to the file format, the SEI message is in a part of the file that is read by the decoding device before a part of the file that includes the encoded video bitstream.

In some aspects, the encoded video bitstream, the SEI message, and the information associated with the encoded video bitstream are received in a data stream, wherein the data stream is formatted according to a streaming format. These aspects further include reading, from the data stream, a description of the encoded video data, wherein the description includes the SEI message In some aspects, the encoded video bitstream, the SEI message, and the information associated with the encoded video bitstream are received in a plurality of network packets. These aspects further include reading the SEI message from a payload portion of a first packet from the plurality of network packets. These aspects further include reading the encoded video data from one or more packets from the plurality of network packets, wherein the one or more packets follow the first packet in transmission order.

In some aspects, the encoded video bitstream, the SEI message, and the information associated with the encoded video bitstream are received over a network, wherein the encoded video bitstream is encapsulated according to a real-time transfer protocol, wherein the SEI message is included in a session description, wherein the session description is formatted according to a session description protocol.

BRIEF DESCRIPTION OF THE DRAWINGS

Illustrative examples of the present application are described in detail below with reference to the following drawing figures:

FIG. 8 illustrates an example of a process for decoding video data.

DETAILED DESCRIPTION

Figure 1:
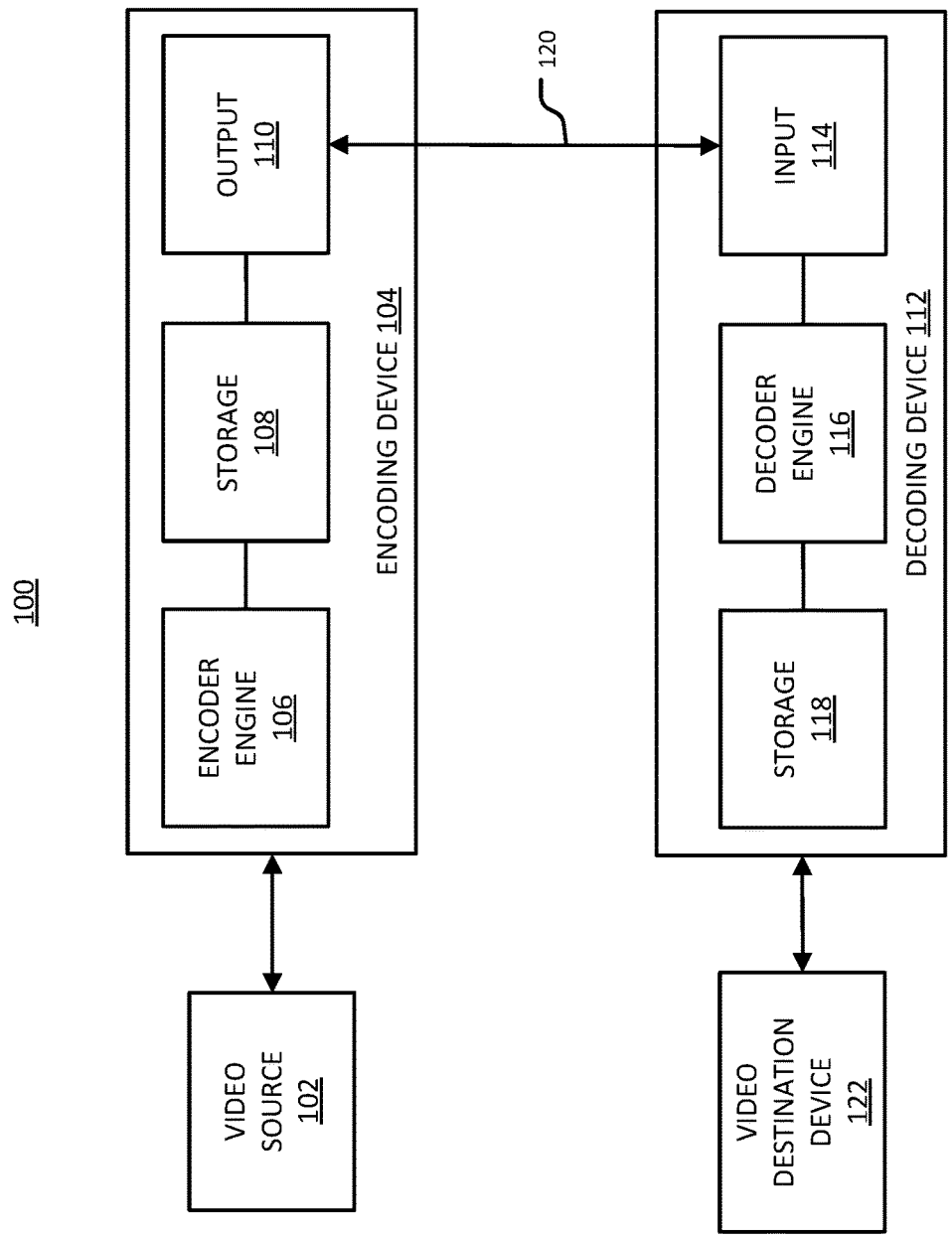
FIG. 1 is a block diagram illustrating an example of a video coding system.

Certain aspects and examples of this disclosure are provided below. Some of these aspects and examples may be applied independently and some of them may be applied in combination as would be apparent to those of skill in the art. In the following description, for the purposes of explanation, specific details are set forth in order to provide a thorough understanding of various possible implementations. However, it will be apparent that various examples may be practiced without these specific details. The figures and description are not intended to be restrictive.

The ensuing description provides example implementations only, and is not intended to limit the scope, applicability, or configuration of the disclosure. Rather, the ensuing description of the example implementations will provide those skilled in the art with an enabling description for implementing an example. It should be understood that various changes may be made in the function and arrangement of elements without departing from the spirit and scope of the application as set forth in the appended claims.

Specific details are given in the following description to provide a thorough understanding of the examples. However, it will be understood by one of ordinary skill in the art that the examples may be practiced without these specific details. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples.

Also, it is noted that individual examples may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, the examples discussed herein may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

As more devices and systems provide consumers with the ability to consume digital video data, the need for efficient video coding techniques becomes more important. Video coding is needed to reduce storage and transmission requirements necessary to handle the large amounts of data present in digital video data. Various video coding techniques may be used to compress video data into a form that uses a lower bit rate while maintaining high video quality. As used herein, "coding" refers to "encoding" and "decoding."

Supplemental Enhancement Information (SEI) messages in an encoded bitstream can be used to assist in the decoding and/or display of the encoded bitstream, or for another purpose. SEI messages are "supplemental," in that the data in SEI messages is not required for constructing luma or chroma samples during the decoding process. Additionally, decoders that conform to a video coding standard that supports SEI messages are not required to process SEI messages in order to be conforming. For some coding standards, some SEI message information may be required to check bitstream conformance or for outputting timing decoder conformance.

SEI messages can be used to provide additional information about an encoded bitstream, which can be used to change the presentation of the bitstream once the bitstream is decoded, or to provide information to a decoder. For example, SEI messages have been used to provide frame packing information (e.g., describing the manner in which video data is arranged in a video frame), content descriptions (e.g., to indicate that the encoded bitstream is, for example, 360-degree video), and color information (e.g., color gamut and/or color range), among other things.

Though video coding standards provide that SEI messages are not required for decoding an encoded bitstream, in some cases, the information carried in SEI messages may be essential for the decoding processing. For example, SEI messages can be used to describe the format of the video data encoded in the bitstream, without which a decoder may not be able to present the video as intended. For example, an SEI message can be used to signal to a decoder that the encoded bitstream includes 360-degree video. In this example, the decoder can use this information to render the video data for a 360-degree presentation. Alternatively, if the decoder is not capable of rendering 360-degree video, the decoder can use this information to not render the video data, rather than attempting to render the video data and presenting a badly distorted video sequence. As another example, a content generator may have specified that the encoded video data be rendered with a particular color gamut. In this example, without the data in the SEI message, the decoder may render the video with a different color gamut, and thus present the video data in a way other than was intended.

In various implementations, provided are techniques, as well as systems that implement these techniques, for SEI messages that distinguish "essential" information from "non-essential" information. In various implementations, an encoder can be configured to determine whether information associated with video data is essential or is not essential. For example, the encoder can be configured with parameters that identify essential information. The parameters can indicate, for a particular video, that information such as a frame packing arrangement or color volume or other information is essential for the particular video.

In various implementations, different types of SEI messages can be defined, where one or more of these types of SEI messages can indicate whether information associated with a particular video is essential or not essential, for example, as determined by an encoding device, for presenting (e.g., the presentation as intended by the encoding device) the video data. As provided herein, the terms "essential" and "non-essential" are used to distinguish information that has been deemed (e.g., by an encoding device and/or content provider/generator) as required for presenting a video in a particular way (e.g., the intended presentation or rendering) from information that is not needed for the presentation of the video in the particular way. Whether information is essential or non-essential can be defined (e.g., determined or set) by the content generator. For example, for some video data, frame packing information or color conversion information may be deemed essential by the content generator, while layer information may be non-essential. As another example, for some video data, filtering information may be essential, while timing information is non-essential. Both essential and non-essential information are not required for decoding the video from a bitstream.

In one example, a manifest SEI message and a prefix SEI message are provided. In this example, the manifest SEI message includes a listing of type types of SEI messages that are present or absent in a bitstream, and whether any of the SEI messages in the bitstream include essential information. Also in this example, a prefix SEI message can include a prefix indication, which can indicate a type of the payload carried in the prefix SEI message. The payload can include information that may or may not be essential.

In another example, an SEI message is defined for essential information, which is referred to as an Essential Supplemental Information (ESI) SEI message, and an SEI message is defined for non-essential information, which is referred to as a Non-essential Supplemental Information (NSI) SEI message. Using the ESI SEI and NSI SEI, a video coding standard can support two different kinds of SEI messages, which can be prioritized by a decoder that supports these SEI message types.

In various example video coding standards, SEI messages can be placed in certain parts of an encoded bitstream, but need not be placed at any particular point. For example, SEI messages are not required to be placed early in the encoded bitstream. In these examples, SEI messages that include essential information may not be seen by a decoder before the decoder begins rendering the video data in an encoded bitstream.

In various implementations, provided are techniques, and systems that implement these techniques, for using encapsulation formats such that SEI messages can be seen early by a decoder. Encapsulation formats include, for example, Organization for Standardization (ISO) base media file format (ISOBMFF), Session Description Protocol (SDP), Dynamic Adaptive Streaming over Hypertext Transfer Protocol (DASH), and Motion Picture Experts Group Transport Stream (MPEG-TS), among others. In various implementations, the formats defined by these encapsulation formats can be used to place SEI messages where an decoder can find the SEI messages early in the process of decoding reading the video data. Thus, decoders that support SEI messages for essential information can obtain the information provided by these messages before beginning decoding of the pictures.

User of SEI messages that can indicate essential or non-essential information can improve the operation of the decoder. For example, without SEI messages that can flag essential information, some decoders may attempt to decode and render a bitstream without first determining whether the system is capable of displaying the video. In this example, the result may be that the video, when displayed, is badly distorted or is otherwise not presented in the manner that was intended by the content generator.

In some examples, the decoder may, after having started decoding the video, encounter the essential information, for example in an SEI message included in the bitstream. In these examples, some decoders may be able to correct the output, and start displaying the video as intended. Some decoders, however, may determine, from the SEI message, that the system does not support video, and is not able to display the video. In these cases, the system may have to decide whether to stop decoding and rendering the video or to find a version of the video that the system is capable of displaying. If the system can find a version of the video that the system is capable of displaying, then the system may further have to decide whether to start decoding the video from the beginning, or conducting seek operations to start near the last point in time that the viewer saw. In either case, the decoder expend processing time to start over. Additionally, the processing time spent on the decoding the video that could not be properly displayed is wasted.

One solution for the problem of obtaining the essential information is for the decoder to search the encoded bitstream for the essential information. This solution, however, may require a significant amount of memory for the decoder to buffer the encoded bitstream, and may cause a significant delay before the system can begin playing the video.

In each of the above examples, by providing essential information in a manner that enables a decoder to quickly identify and find the essential information, the decoder can avoid having to search for the essential information, can avoid decoding a bitstream that the system is not able to display, and can avoid the system displaying the decoded bitstream in a manner other than what was intended. The decoder can further possibly be operated more efficiently, with less processing time wasted.

FIG. 1 is a block diagram illustrating an example of a video coding system 100 including an encoding device 104 and a decoding device 112. In some examples, the encoding device 100 of the video coding system 100 can generate ESI SEI messages and/or NSI SEI messages, and the decoding device 112 can decode ESI SEI messages and/or NSI SEI messages, and make use of the information included in these messages. The encoding device 104 may be part of a source device, and the decoding device 112 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. In some examples, system 100 can support one-way or two-way video transmission to support applications such as video conferencing, video streaming, video playback, video broadcasting, gaming, and/or video telephony.

The encoding device 104 (or encoder) can be used to encode video data using a video coding standard or protocol to generate an encoded video bitstream. Examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions, and High Efficiency Video Coding (HEVC) or ITU-T H.265. Various extensions to HEVC deal with multi-layer video coding exist, including the range and screen content coding extensions, 3D video coding (3D-HEVC) and multiview extensions (MV-HEVC) and scalable extension (SHVC). The HEVC and its extensions has been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). MPEG and ITU-T VCEG have also formed a joint exploration video team (WET) to explore new coding tools for the next generation of video coding standard. The reference software is called JEM (joint exploration model).

Many examples described herein provide examples using the JEM model, the HEVC standard, and/or extensions thereof. However, the techniques and systems described herein may also be applicable to other coding standards, such as AVC, MPEG, extensions thereof, or other suitable coding standards that currently exist or future coding standards. Accordingly, while the techniques and systems described herein may be described with reference to a particular video coding standard, one of ordinary skill in the art will appreciate that the description should not be interpreted to apply only to that particular standard.

Referring to FIG. 1, a video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures or frames. A picture or frame of a video is a still image of a scene. The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a RASL flag (e.g., NoRaslOutputFlag) equal to 1. Otherwise, a random access point picture (with RASL flag equal to 0) does not start a CVS. An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. In one example, the header is one-byte for H.264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. A VCL NAL unit includes one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments. The slices are then partitioned into coding tree blocks (CTBs) of luma samples and chroma samples. A CTB of luma samples and one or more CTBs of chroma samples, along with syntax for the samples, are referred to as a coding tree unit (CTU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which the same two-dimensional transform is applied for coding a prediction residual signal. A transform unit (TU) represents the TBs of luma and chroma samples, and corresponding syntax elements.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some examples, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

In some examples, the one or more slices of a picture are assigned a slice type. Slice types include an I slice, a P slice, and a B slice. An I slice (intra-frames, independently decodable) is a slice of a picture that is only coded by intra-prediction, and therefore is independently decodable since the I slice requires only the data within the frame to predict any prediction unit or prediction block of the slice. A P slice (uni-directional predicted frames) is a slice of a picture that may be coded with intra-prediction and with uni-directional inter-prediction. Each prediction unit or prediction block within a P slice is either coded with Intra prediction or inter-prediction. When the inter-prediction applies, the prediction unit or prediction block is only predicted by one reference picture, and therefore reference samples are only from one reference region of one frame. A B slice (bi-directional predictive frames) is a slice of a picture that may be coded with intra-prediction and with inter-prediction (e.g., either bi-prediction or uni-prediction). A prediction unit or prediction block of a B slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision, or one-eighth pixel precision), a reference picture to which the motion vector points, a reference index, a reference picture list (e.g., List 0, List 1, or List C) for the motion vector, or any combination thereof.

The encoding device 104 may then perform transformation and quantization. For example, following prediction, the encoder engine 106 may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., issuing inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or the like) may be applied to residual data in each CU. In some examples, a TU may be used for the transform and quantization processes implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some examples following intra-predictive or inter-predictive coding using PUs of a CU, the encoder engine 106 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. Encoder engine 106 may form the TUs including the residual data for the CU, and may then transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

As previously described, an HEVC bitstream includes a group of NAL units including VCL NAL units and non-VCL NAL units. VCL NAL units include coded picture data forming a coded video bitstream. For example, a sequence of bits forming the coded video bitstream is resent in VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bit rate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

A PPS includes information that applies to all slices in a given picture. Because of this, all slices in a picture refer to the same PPS. Slices in different pictures may also refer to the same PPS. An SPS includes information that applies to all pictures in a same coded video sequence (CVS) or bitstream. As previously described, a coded video sequence is a series of access units (AUs) that starts with a random access point picture (e.g., an instantaneous decode reference (IDR) picture or broken link access (BLA) picture, or other appropriate random access point picture) in the base layer and with certain properties (described above) up to and not including a next AU that has a random access point picture in the base layer and with certain properties (or the end of the bitstream). The information in an SPS may not change from picture to picture within a coded video sequence. Pictures in a coded video sequence may use the same SPS. The VPS includes information that applies to all layers within a coded video sequence or bitstream. The VPS includes a syntax structure with syntax elements that apply to entire coded video sequences. In some examples, the VPS, SPS, or PPS may be transmitted in-band with the encoded bitstream. In some examples, the VPS, SPS, or PPS may be transmitted out-of-band in a separate transmission than the NAL units containing coded video data.

A video bitstream can also include Supplemental Enhancement Information (SEI) messages. For example, an SEI NAL unit can be part of the video bitstream. In some cases, an SEI message can contain information that is not needed by the decoding process. For example, the information in an SEI message may not be essential for the decoder to decode the video pictures of the bitstream, but the decoder can be use the information to improve the display or processing of the pictures (e.g., the decoded output). The information in an SEI message can be embedded metadata. In one illustrative example, the information in an SEI message could be used by decoder-side entities to improve the viewability of the content. In some instances, certain application standards may mandate the presence of such SEI messages in the bitstream so that the improvement in quality can be brought to all devices that conform to the application standard (e.g., the carriage of the frame-packing SEI message for frame-compatible plano-stereoscopic 3DTV video format, where the SEI message is carried for every frame of the video, handling of a recovery point SEI message, use of pan-scan scan rectangle SEI message in DVB, in addition to many other examples).

The output 110 of the encoding device 104 may send the NAL units making up the encoded video data over the communications link 120 to the decoding device 112 of the receiving device. The input 114 of the decoding device 112 may receive the NAL units. The communications link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video data may be modulated according to a communication standard, such as a wireless communication protocol, and transmitted to the receiving device.

In some examples, the encoding device 104 may store encoded video data in storage 108. The output 110 may retrieve the encoded video data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data.

The input 114 of the decoding device 112 receives the encoded video bitstream data and may provide the video bitstream data to the decoder engine 116 or to storage 118 for later use by the decoder engine 116. The decoder engine 116 may decode the encoded video bitstream data by entropy decoding (e.g., using an entropy decoder) and extracting the elements of the one or more coded video sequences making up the encoded video data. The decoder engine 116 may then rescale and perform an inverse transform on the encoded video bitstream data. Residual data is then passed to a prediction stage of the decoder engine 116. The decoder engine 116 then predicts a block of pixels (e.g., a PU). In some examples, the prediction is added to the output of the inverse transform (the residual data).

The decoding device 112 may output the decoded video to a video destination device, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

In some examples, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device. An example of specific details of the encoding device 104 is described below with reference to FIG. 9. An example of specific details of the decoding device 112 is described below with reference to FIG. 10.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers usually represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

As noted above, SEI messages can provide information that is not required to generate luma and chroma values from an encoded video bitstream. SEI messages, however, may nevertheless carry information that may be considered essential for rendering the bitstream as was intended by the content generator.

Figure 2:
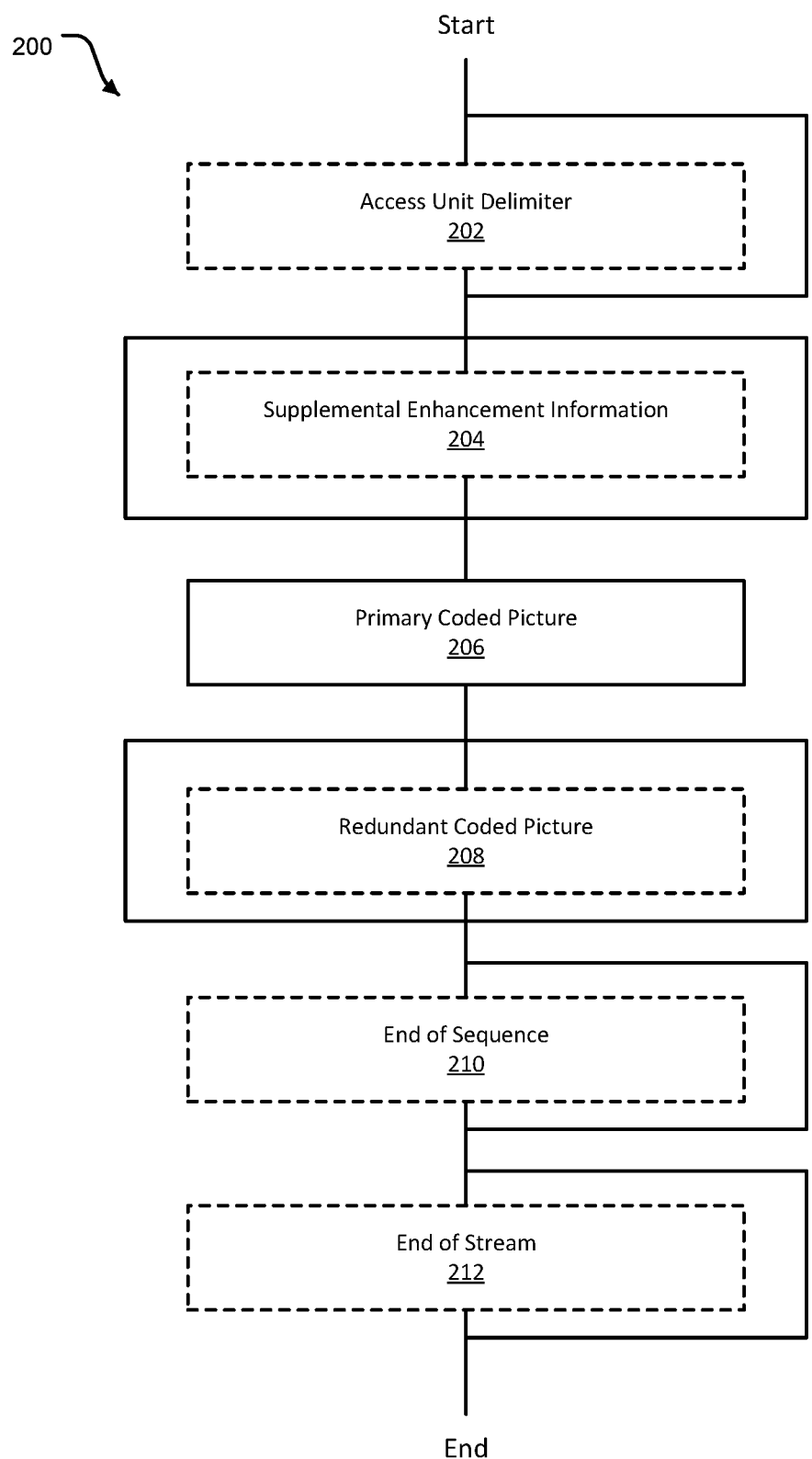
FIG. 2 illustrates an example of an access unit.

FIG. 2 illustrates an example of an access unit 200 (AU) that can be part of a bitstream. As bitstream can include a series of access units, each providing a coded picture and possibly some information about the bitstream. Decoding each access unit results in one decoded picture. Access units such as the example access unit 200 illustrated here are included in the H.264/AVC and the H.265/HEVC standards.

An access unit 200, as illustrated in the example of FIG. 2, can include a set of NAL units, which together compose a primary coded picture. An access unit 200 can include optional NAL units, which are illustrated here in dotted lines. An access unit 200 can optionally start with an access unit delimiter 202. The access unit delimiter can aid in locating the start of the access unit. The access unit 200 can also optionally include supplemental enhancement information 204 (e.g., an SEI message) that precedes the primary coded picture 206. The SEI can contain data such as picture timing information. The primary coded picture 206 can include video coding layer (VCL) NAL units. The VCL NAL units include slices or slice data partitions that represent the samples of the video picture. Following the primary coded picture 206 may be some additional VCL NAL units that contain a redundant coded picture 208. The redundant coded picture 208 can include redundant representations of areas of the same video picture, and are available for use by a decoder in recovering from loss or corruption of the data in the primary coded picture 206. Decoders are not required to decode redundant coded pictures if redundant coded pictures are present.

When the primary coded picture 206 is the last picture of a coded video sequence, the access unit 200 can include an end of sequence 210 NAL unit, to indicate the end of the sequence. When the primary coded picture 206 is also the last coded picture in the bitstream, the access unit 200 can also include an end of stream 212 NAL unit (also referred to as an end of bitstream NAL unit).

An SEI NAL unit can be used to provide various information to a decoder. Table 1 below provides an example of the general syntax of SEI messages, as provided by International Telecommunications Union (ITU-T) H.265 "Series H: Audiovisual and Multimedia Systems Infrastructure of audiovisual services—Coding of moving video" (hereinafter Recommendation ITU-T H.265). In Table 1, different payload types have been defined for different information that can be included in an SEI message. The syntax provided below include only a subset of SEI message types that have been defined and/or included in the HEVC standard.

TABLE 1

| | Descriptor |
|---|---|

```
sei_payload( payloadType, payloadSize) {
    if( nal_unit_type = = PREFIX_SEI_NUT )
        if( payloadType = = 0 )
            buffering_period( payloadSize )
        else if( payloadType = = 1 )
            pic_timing( payloadSize )
        else if( payloadType = = 2 )
            pan_scan_rect( payloadSize )
        else if( payloadType = = 3 )
            filler_payload( payloadSize )
        else if( payloadType = = 4 )
            user_data_registered_itu_t_t35( payloadSize )
        else if( payloadType = = 5 )
            user_data_unregistered( payloadSize )
        else if( payloadType = = 6 )
            recovery_point( payloadSize )
        else if( payloadType = = 9 )
            scene_info( payloadSize )
        else if( payloadType = = 15 )
            picture_snapshot( payloadSize )
        else if( payloadType = = 16 )
            progressive_refinement_segment_start( payloadSize )
        else if( payloadType = = 17 )
            progressive_refinement_segment_end( payloadSize )
        else if( payloadType = = 19 )
            film_grain_characteristics( payloadSize )
        else if( payloadType = = 22 )
            post_filter_hint( payloadSize )
        else if( payloadType = = 23 )
            tone_mapping_info( payloadSize )
        else if( payloadType = = 45 )
            frame_packing_arrangement( payloadSize )
        else if( payloadType = = 47 )
            display_orientation( payloadSize )
        else if( payloadType = = 128 )
            structure_of_pictures_info( payloadSize )
        else if( payloadType = = 129 )
            active_parameter_sets( payloadSize )
        else if( payloadType = = 130 )
            decoding_unit_info( payloadSize )
        else if( payloadType = = 131)
            temporal_sub_layer_zero_index( payloadSize )
        else if( payloadType = = 133 )
            scalable_nesting( payloadSize )
        else if( payloadType = = 134 )
            region_refresh_info( payloadSize )
        else if( payloadType = = 135 )
            no_display( payloadSize )
        else if( payloadType = = 136 )
            time_code( payloadSize )
        else if( payloadType = = 137 )
            mastering_display_colour_volume( payloadSize )
        else if( payloadType = = 138 )
            segmented_rect_frame_packing_arrangement( payloadSize )
        else if( payloadType = = 139 )
            temporal_motion_constrained_tile_sets( payloadSize )
        else if( payloadType = = 140 )
            chroma_resampling_filter_hint( payloadSize )
        else if( payloadType = = 141 )
            knee_function_info( payloadSize )
        else if( payloadType = = 142 )
            colour_remapping_info( payloadSize )
        else if( payloadType = = 143 )
            deinterlaced_field_identification( payloadSize )
        else if( payloadType = = 160 )
            layers_not_present( payloadSize )
        else if( payloadType = = 161 )
            inter_layer_constrained_tile_sets( payloadSize )
        else if( payloadType = = 162 )
            bsp_nesting( payloadSize )
        else if( payloadType = = 163 )
            bsp_initial_arrival_time( payloadSize )
        else if( payloadType = = 164 )
            sub_bitstream_property( payloadSize )
        else if( payloadType = = 165 )
            alpha_channel_info( payloadSize )
```

TABLE 1-continued

| | Descriptor |
|---|---|
| ```
        else if( payloadType = = 166 )
            overlay_info( payloadSize )
        else if( payloadType = = 167 )
            temporal_mv_prediction_constraints( payloadSize )
        else if( payloadType = = 168 )
            frame_field_info( payloadSize )
        else if( payloadType = = 176 )
            three_dimensional_reference_displays_info( payloadSize )
        else if( payloadType = = 177 )
            depth_representation_info( payloadSize )
        else if( payloadType = = 178 )
            multiview_scene_info( payloadSize )
        else if( payloadType = = 179 )
            multiview_acquisition_info( payloadSize )
        else if( payloadType = = 180 )
            multiview_view_position( payloadSize )
        else if( payloadType = = 181 )
            alternative_depth_info( payloadSize )
        else
            reserved_sei_message( payloadSize )
    else /* nal_unit_type = = SUFFIX_SEI_NUT */
        if( payloadType = = 3 )
            filler_payload( payloadSize )
        else if( payloadType = = 4 )
            user_data_registered_itu_t_t35( payloadSize )
        else if( payloadType = = 5 )
            user_data_unregistered( payloadSize )
        else if( payloadType = = 17 )
            progressive_refinement_segment_end( payloadSize )
        else if( payloadType = = 22 )
            post_filter_hint( payloadSize )
        else if( payloadType = = 132 )
            decoded_picture_hash( payloadSize )
        else
            reserved_sei_message( payloadSize )
    if( more_data_in_payload( ) ) {
        if( payload_extension_present( ) )
            reserved_payload_extension_data
        payload_bit_equal_to_one
        while( !byte_aligned( ) )
            payload_bit_equal_to_zero
    }
}
``` | <br><br><br><br><br><br><br><br><br><br><br><br><br><br><br><br><br><br><br><br><br><br><br><br><br><br><br><br><br><br><br><br><br><br><br><br>u(v)<br>f(1)<br><br>f(1) |

In various video coding specifications, as long as a piece of information does not affect decoding of picture samples, that information can be included in an SEI message. Some information carried in SEI messages may be for optimization purposes and may be ignored by a decoder without the rendering of the video being presented in an unacceptable manner. Some other information carried in SEI messages, however, such as frame packing information, omnidirectional projection indication information, and subtitling or captioning information, may be essential for ensuring acceptable video system performance or for the viewing experience. for example, certain post-decoding operations, such as de-packing or de-warping, must be applied before frame-packed or 360 degrees omnidirectional projected video can be displayed. Similarly, subtitling or captioning may be necessary when the audio that accompanies a video is not in a language that the viewer understands.

For some coding systems and applications, information such as frame packing information, omnidirectional projection indication information, and subtitling or captioning information is essential for the video application system to perform efficiently and/or correctly (e.g., presenting a video as the video was meant to be seen). For these systems and applications, such information should thus be treated similarly as information that is important for video decoding interoperability (e.g., as codec, profile, and level in systems operations). For example, this essential information should be considered when encapsulating a coded video bitstream, for example, into a media file according to the ISO base media file format (ISOBMFF) or a media presentation according to the dynamic adaptive streaming over HTTP (DASH).

When encapsulating a coded video bitstream into an ISOBMFF file or a DASH media presentation, essential information, such as mentioned above, can be exposed at a high level, such as, for example, in the file format sample entry, the DASH media presentation description (MPD), and/or in MIME type parameters. By placing the essential information at a high level in the encapsulation formation, the decoder can avoid having to scan an entire bitstream to determine what information may be included in the SEI messages in the bitstream. Additionally, the decoder can avoid having to categorize SEI messages based on essentiality conditions. Instead, having such information easily accessible early on in the bitstream, (e.g., where profile and level information is signaled) or, for existing standards, collectively in one SEI message, could simplify the implementation of the decoder. Having early access to the essential information can enable the decoder to make preemptive decisions on how to best handle the decoded video. Additionally, video coding standards need not be modified whenever an SEI message that contains essential information is defined.

In various implementations, an SEI message is defined for essential information, which is referred to as an Essential Supplemental Information (ESI) SEI message, and an SEI message is defined for non-essential information, which is referred to as a Non-essential Supplemental Information (NSI) SEI message. As noted above, the terms "essential" and "non-essential" are being used to classify two different types of SEI messages. The information being conveyed in ESI SEI and NSI SEI messages is determined by a content generator, for example in the configuration of an encoder that is encoding a video presentation. ESI SEI and NSI SEI need not convey any specific information, and can be used by a decoder in identifying information the decoder should process before processing other data.

In various implementations, a encoder can determine information that is essential. For example, the encoder can be configured to identify certain information as essential. In these examples, the encoder can make use of the ESI SEI for the essential information. The encoder can, further, optionally use the NSI ESI for non-essential information.

In various implementations, a decoder can be configured to identify ESI SEI and NSI ESI messages, and to make use of the information included in these messages. When the decoder finds neither of these messages, the decoder can proceed with decoding the bitstream according the applicable standard. Decoder that are not configured to process ESI SEI or NSI SEI messages can treat these messages as unidentifiable SEI messages. In some examples, when a decoder encounters and unidentifiable SEI message, the decoder can be configured to stop processing the bitstream. Alternatively, in some examples, the decoder may proceed with decoding the bitstream.

In the examples that follow, the ESI SEI and NSI SEI messages are described in the context of HEVC, and it is understood that these examples can also be applied to other video coding standards that support SEI messages, such as AVC.

ESI SEI Message

The following provides an example syntax and semantics for the ESI SEI message. Similar syntax and semantics can be used with various video coding standards.

ESI SEI Message Syntax

An example of the ESI SEI message syntax is as follows:

|  | Descriptor |
| --- | --- |
| essential_supplemental_information( payloadSize ) { | |
|   num_essential_sei_msg_types | u(16) |
|   for( i = 0; i < num_essential_sei_msg_types; i++ ) { | |
|     essential_sei_payload_type[ i ] | u(16) |
|     num_esei_init_payload_databits[ i ] | u(16) |
|     for( j = 0; j < num_esei_init_pldbits; j++ ) { | |
|       esei_payload_data_bit[ i ][ j ] | u(1) |
|     while( !byte_aligned( ) ) | |
|       esei_alignment_bit_equal_to_zero /* equal to 0 */ | f(1) |
|     } | |
|   } | |
| } | |

Alternatively, the coding of the three u(16)-coded syntax elements is replaced with ue(v) coding (i.e., replace all instances of "u(16)" above with "ue(v)").

ESI SEI Message Semantics

The essential supplemental information (ESI) SEI message conveys information on all essential SEI messages present in the bitstream. An essential SEI message is such an SEI message for which the carried information is considered by the encoder (i.e., the content producer) as essential for the decoder side to properly process to enable a desirable user experience. It is at the discretion of the encoder (i.e., the content producer) to determine which types of SEI messages are essential SEI messages in a particular bitstream.

When an ESI SEI message is present in any access unit (AU) of a CVS, an ESI SEI message shall be present in the first access unit of the CVS. The ESI SEI message persists in decoding order from the current access unit until the end of the CVS.

An SEI NAL unit containing an ESI SEI message shall not contain any other SEI message that is not a non-essential supplemental information SEI message. When there are multiple ESI messages present in a CVS, they shall have the same content.

num_essential_sei_msg_types specifies the number of types of SEI messages present in the CVS that are considered as essential SEI messages.

essential_sei_payload_type[i] indicates the payloadType value of the i-th type of essential SEI messages. For any two different values m and n, the values of essential_sei_payload_type[m] and essential_sei_payload_type[n] shall not be identical.

num_esei_init_payload_databits[i] specifies the number of the following bits that provide additional information about the i-th type of essential SEI messages present in the CVS.

esei_payload_data_bit[i][j] specifies the j-th bit of the bits that provide additional information about the i-th type of essential SEI messages present in the CVS.

The num_esei_init_payload_databits[i] bits follow the SEI payload syntax for the payloadType of the i-th type of essential SEI messages, and contain a number of syntax elements starting from the first syntax element in the SEI payload syntax, but may or may not contain all the syntax elements in the SEI payload syntax. The last bit shall be the last bit of a syntax element in the SEI payload syntax. The syntax elements contained in these bits have the same semantics as if they were in an SEI message with the payloadType, with the exception that the information here applies to the entire CVS.

These bits should provide sufficient information for indicating what types of processing is needed at the decoder side from processing capability point of view, based on which systems layer entities can determine whether the decoder side can properly process the bitstream to enable a desirable user experience. For example, if the payloadType is 45 (i.e., the frame packing arrangement SEI message), these bits should at least include the syntax element frame_packing_arrangement_type. For another example, if the payloadType is 150 (i.e., the omnidirectional projection indication SEI message as specified in JCTVC-Z1005), these bits should at least include the syntax element projection type.

esei_alignment_bit_equal_to_zero shall be equal to 0.

NSI SEI Message

The following provides an example syntax and semantics for the NSI SEI message. Similar syntax and semantics can be used with various video coding standards.

NSI SEI Message Syntax

An example of the NSI SEI message syntax is as follows:

|  | Descriptor |
| --- | --- |
| nonessential_supplemental_information( payloadSize ) { | |
|   num_nonessential_sei_msg_types | u(16) |

| | Descriptor |
|---|---|
| for( i = 0; i < num_nonessential_sei_msg_types; i++ ) { | |
|    nonessential_sei_payload_type[ i ] | u(16) |
|    num_nesei_init_payload_databits[ i ] | u(16) |
|    for( j = 0; j < num_nesei_init_pldbits; j++ ) { | |
|      nesei_payload_data_bit[ i ][ j ] | u(1) |
|    while( !byte_aligned( ) ) | |
|      nesei_alignment_bit_equal_to_zero /* equal to 0 */ | f(1) |
|    } | |
| } | |

Alternatively, the coding of the three u(16)-coded syntax elements is replaced with ue(v) coding, i.e., replace all instances of "u(16)" above with "ue(v)".

NSI SEI Message Semantics

The non-essential supplemental information (NSI) SEI message conveys information on all the non-essential SEI messages present in the bitstream. A non-essential SEI message is such an SEI message that is not considered by the encoder (i.e., the content producer) as an essential SEI message. It is at the discretion of the encoder (i.e., the content producer) to determine which types of SEI messages are non-essential SEI messages in a particular bitstream.

When a NSI SEI message is present in any access unit of a CVS, a NSI SEI message shall be present in the first access unit of the CVS. The NSI SEI message persists in decoding order from the current access unit until the end of the CVS.

An SEI NAL unit containing a NSI SEI message shall not contain any other SEI message that is not an ESI SEI message. When there are multiple NSI messages present in a CVS, they shall have the same content.

When a particular type of SEI messages is identified by an ESI SEI message in a CVS as essential SEI messages, the same type of SEI messages shall not be identified by a NSI SEI message in the CVS as non-essential SEI messages.

num_nonessential_sei_msg_types specifies the number of types of SEI messages present in the CVS that are considered as non-essential SEI messages.

nonessential_sei_payload_type[i] indicates the payloadType value of the i-th type of non-essential SEI messages. For any two different values m and n, the values of nonessential_sei_payload_type[m] and nonessential_sei_payload_type[n] shall not be identical.

num_nesei_init_payload_databits[i] specifies the number of the following bits that provide additional information about the i-th type of non-essential SEI messages present in the CVS.

nesei_payload_data_bit[i][j] specifies the j-th bit of the bits that provide additional information about the i-th type of non-essential SEI messages present in the CVS.

The num_nesei_init__payload_databits[i] bits follow the SEI payload syntax for the payloadType of the i-th type of non-essential SEI messages, and contain a number of syntax elements starting from the first syntax element in the SEI payload syntax, but may or may not contain all the syntax elements in the SEI payload syntax. The last bit shall be the last bit of a syntax element in the SEI payload syntax. The syntax elements contained in these bits have the same semantics as if they were in an SEI message with the payloadType, with the exception that the information here applies to the entire CVS.

nesei_alignment_bit_equal_to_zero shall be equal to 0.

In various implementations, syntax and semantics are provided for indicating the presences, absence, and/or essentiality of SEI messages. In various implementations, an SEI manifest is defined, as well as an SEI message that includes SEI prefix indications. The SEI manifest can be used to convey information about SEI messages that are included in a bitstream. SEI prefix indications can be used to identify the payload in an SEI message, and can be use used by a decoder to determine the type of process that is needed for the content in a bitstream.

In various implementations, a encoder can determine information that is essential. For example, the encoder can be configured to identify certain information that essential to the display of a video. In these examples, the encoder can make use of the SEI prefix indication SEI message to indicate the essential information, and the SEI manifest SEI message to describe the SEI messages included in the bitstream In various implementations, a decoder can be configured to identify SEI manifest SEI messages and SEI prefix SEI messages, and to make use of the information included in these messages. When the decoder finds neither of these messages, the decoder can proceed with decoding the bitstream according the applicable standard. Decoder that are not configured to process SEI manifest and SEI prefix messages can treat these messages as unidentifiable SEI messages. In some examples, when a decoder encounters and unidentifiable SEI message, the decoder can be configured to stop processing the bitstream. Alternatively, in some examples, the decoder may proceed with decoding the bitstream.

A first example provides an SEI manifest SEI message and an SEI prefix indication SEI message. Syntax and semantics for each of these SEI messages is provided below.

The SEI Manifest SEI Message

| SEI manifest SEI message syntax | |
|---|---|
| | Descriptor |
| sei_manifest( payloadSize ) { | |
|    manifest_num_sei_msg_types | u(16) |
|    for( i = 0; i < manifest_num_sei_msg_types; i++ ) { | |
|      manifest_sei_payload_type[ i ] | u(16) |
|      manifest_sei_description[ i ] | u(8) |
|    } | |
| } | |

SEI Manifest SEI Message Semantics

The SEI manifest SEI message conveys information on SEI messages that may be assumed by a receiver of the bitstream to be present or not present. Such information may include:

1) A receiver of the bitstream may assume that certain types of SEI messages are present in the CVS.

NOTE 1—With such an "assume" wording used, it would not be an error when the "promises" are broken and, regardless whether the "promises" are broken, the client assumptions can still be considered as correct.

2) For each type of SEI message that may be assumed to be present in the CVS, the essentiality of the SEI messages of this type.

The essentiality may be indicated as essential, non-essential, or undetermined.

An SEI message is considered as essential by the encoder (i.e., the content producer) when the carried information is considered as essential from the decoder's side to properly process the content and enable a desirable user experience. It is at the discretion of the encoder to determine which SEI messages are considered as essential in a particular bitstream. However, some SEI messages, such as the frame packing arrangement, segmented rectangular frame packing arrangement, display orientation, and omnidirectional projection indication SEI messages, should always be considered as essential.

3) A receiver of the bitstream may assume that certain types of SEI messages are not present in the CVS.

NOTE 2—For example, based on the signalled SEI manifest SEI message, a receiver of the bitstream could assume that there is no frame packing arrangement SEI message, segmented rectangular frame packing arrangement SEI message, display orientation SEI message, or omnidirectional projection indication SEI message in the bitstream. Therefore, the decoded video pictures could likely be rendered for viewing without the need of any additional post-processing that is commonly required when such SEI messages are present.

When an SEI manifest SEI message is present in any access unit of a CVS, an SEI manifest SEI message shall be present in the first access unit of the CVS. The SEI manifest SEI message persists in decoding order from the current access unit until the end of the CVS. When there are multiple SEI manifest SEI messages present in a CVS, they shall have the same content.

An SEI NAL unit containing an SEI manifest SEI message shall not contain any other SEI message than SEI prefix indication SEI messages. When present in an SEI NAL unit, the SEI manifest SEI message shall be the first SEI message in the SEI NAL unit.

manifest_num_sei_msg_types specifies the number of types of SEI messages for which information is provided in the SEI manifest SEI message.

manifest_sei_payload_type[i] indicates the payloadType value of the i-th type of SEI message for which information is provided in the SEI manifest SEI message. The values of manifest_sei_payload_type[m] and manifest_sei_payload_type[n] shall not be identical when m is not equal to n.

manifest_sei_description[i] provides information on SEI messages with payloadType equal to manifest_sei_payload_type[i] as specified in Table 2.

TABLE 2 manifest_sei_description[i] values

| Value | Description |
|---|---|
| 0 | Indicates that it may be assumed that there is no SEI message with payloadType equal to manifest_sei_payload_type[ i ] present in the CVS. |
| 1 | Indicates that 1) it may be assumed that there are SEI messages with payloadType equal to manifest_sei_payload_type[ i ] present in the CVS, and 2) these SEI messages are considered as essential. |
| 2 | Indicates that 1) it may be assumed that there are SEI messages with payloadType equal to manifest_sei_payload_type[ i ] present in the CVS, and 2) these SEI messages are considered as non-essential. |
| 3 | Indicates that 1) it may be assumed that there are SEI messages with payloadType equal to manifest_sei_payload_type[ i ] present in the CVS, and 2) the essentiality of these SEI messages is undetermined. |
| 4-255 | Reserved |

The value of manifest_sei_description[i] shall be in the range of 0 to 3, inclusive, in bitstreams conforming to this version of this Specification. Other values for manifest_sei_description[i] are reserved for future use by ITU-T ISO/IEC. Decoders shall allow the value of manifest_sei_description [i] greater than or equal to 4 to appear in the syntax and shall ignore all information for payloadType equal to manifest_sei_payload_type[i] signalled in the SEI manifest SEI message and shall ignore all SEI prefix indication SEI messages with prefix_sei_payload_type equal to manifest_sei_payload_type[i].

The SEI Prefix Indication SEI Message

SEI prefix indication SEI message syntax

| | Descriptor |
|---|---|
| sei_prefix_indication( payloadSize ) { | |
|    prefix_sei_payload_type | u(16) |
|    num_sei_prefix_indications_minus1 | u(8) |
|    for( i = 0; i <= num_sei_prefix_indications_minus1; i++ ) { | |
|      num_bits_in_prefix_indication_minus1[ i ] | u(16) |
|      for(j = 0; j <= num_bits_in_prefix_indication_minus1[ i ]; j++ ) | |
|        sei_prefix_databit[ i ][ j ] | u(1) |
|      while( !byte_aligned( ) ) | |
|        byte_alignment_bit_equal_to_zero /* equal to 0 */ | f(1) |
|    } | |
| } | |

SEI Prefix Indication SEI Message Semantics

The SEI prefix indication SEI message carries one or more SEI prefix indications for SEI messages of a particular payloadType. Each SEI prefix indication is a bit string that follows the SEI payload syntax of that payloadType and contains a number of complete syntax elements starting from the first syntax element in the SEI payload.

The receiver may assume that some or all of the SEI messages of this payloadType in the CVS start with these bit strings. A starting bit string typically contains only a true subset of an SEI payload of the type of SEI messages, may contain a full SEI payload, but never contains more than a full SEI payload.

NOTE—It is allowed that some SEI messages of this payloadType do not start with any of the indicated bit strings.

These SEI prefix indications should provide sufficient information for indicating what type of processing is needed or what type of content is included. The former (type of processing) indicates decoder-side processing capability, e.g., whether some type of frame unpacking is needed. The latter (type of content) indicates, for example, whether the bitstream contains subtitle captions in a particular language. Based on the information systems layer, entities can determine whether the decoder side can properly process the bitstream to enable a desirable user experience, or whether the bitstream satisfies the application needs.

In one example, when the payloadType indicates the frame packing arrangement SEI message, an SEI prefix indication should include up to at least the syntax element frame_packing_arrangement_type; when the payloadType indicates the omnidirectional projection indication SEI message, an SEI prefix indication should include up to at least the syntax element projection_type.

In another example, for user data registered SEI messages that are used to carry captioning information, an SEI prefix indication should include up to at least the language code; and for user data unregistered SEIs messages extended for private use, an SEI prefix indication should include up to at least the UUID.

When an SEI prefix indication SEI message is present in any access unit of a CVS, an SEI prefix indication SEI message shall be present in the first access unit of the CVS. The SEI prefix indication SEI message persists in decoding order from the current access unit until the end of the CVS. When there are multiple SEI prefix indication SEI messages present in a CVS, they shall have the same content.

An SEI NAL unit containing an SEI prefix indication SEI message shall not contain any other SEI message than an SEI manifest SEI message.

prefix_sei_payload_type indicates the payloadType value of the SEI messages for which one or more SEI prefix indications are provided in the SEI prefix indication SEI message. The value of prefix_sei_payload_type shall be equal to one of the manifest_sei_payload_type[m] values for which manifest_sei_description[m] is equal to 1 to 3, inclusive, as indicated by an SEI manifest SEI message that applies to the CVS.

num_sei_prefix_indications_minus1 plus 1 specifies the number of SEI prefix indications.

num_bits_in_prefix_indication_minus1[i] plus 1 specifies the number of bits in the i-th SEI prefix indication.

sei_prefix_databit[i][j] specifies the j-th bit of the i-th SEI prefix indication.

The bits sei_prefix_databit[i][j] for j ranging from 0 to num_bits_in_prefix_indication_minus1 [i], inclusive, follow the syntax of the SEI payload with payloadType equal to prefix_sei_payload_type, and contain a number of complete syntax elements starting from the first syntax element in the SEI payload syntax, and may or may not contain all the syntax elements in the SEI payload syntax. The last bit shall be the last bit of a syntax element in the SEI payload syntax.

byte_alignment_bit_equal_to_zero shall be equal to 0.

In the preceding example, the SEI manifest descriptions, which can be small in size, can be in a separate SEI message. The small size of this SEI message enables the SEI message to be carried at a systems level, such as, for example, as a MIME type parameter. The preceding example also allows addition of prefix indications for SEI types for which no prefix indicate has yet be defined. For example a new SEI message can be added without modifying existing SEI message. Additionally, multiple SEI message are not needed for the SEI prefix indications for one particular SEI type. When adding prefix indications for an SEI type for which prefix indications have already be defined, a change to the existing SEI message may be needed.

In various examples, alternative syntax can be used.

In a first example, instead of defining two separate SEI messages, the SEI manifest description and the SEI prefixes can be carried in one SEI message. Example syntax for such an SEI message follows:

| | Descriptor |
|---|---|
| sei_manifest( payloadSize ) { | |
|   manifest_num_sei_msg_types | u(16) |
|   for( i = 0; i < manifest_num_sei_msg_types; i++ ) { | |
|     manifest_sei_payload_type[ i ] | u(16) |
|     manifest_sei_description[ i ] | u(8) |
|   } | |
|   for( i = 0; i < manifest_num_sei_msg_types; i++ ) { | |
|     num_sei_prefix_indications[ i ] | u(8) |
|     for( j = 0; j < num_sei_prefix_indications[ i ]; j++ ) { | |
|       num_bits_in_prefix_indication[ i ][ j ] | u(16) |
|       for( k = 0; k < num_bits_in_prefix_indication[ | |

| | Descriptor |
|---|---|
| i ][ j ]; k++ ) | |
|         sei_prefix_databit[ i ][ j ][ k ] | u(1) |
|     while( !byte_aligned( ) ) | |
|       byte_alignment_bit_equal_to_zero /* equal to 0 */ | f(1) |
|     } | |
|   } | |
| } | |

In the above example, multiple SEI messages (e.g., for the SEI manifest descriptions and the SEI prefix indications for all SEI types) need not be defined. When additional information is needed, however, the SEI message may need to be changed.

In a second example, instead of allowing multiple SEI prefix indications in one SEI prefix indications SEI message, an SEI prefix message can include only one SEI prefix indication. An example syntax for such an SEI message follows.

| | Descriptor |
|---|---|
| sei_prefix_indication( payloadSize ) { | |
|   prefix_sei_payload_type | u(16) |
|   num_bits_in_prefix_indication_minus1 | u(16) |
|   for( i = 0; i <= num_bits_in_prefix_indication_minus1; i++ ) | |
|     sei_prefix_databit[ i ] | u(1) |
| } | |

In the above example, the existing SEI message need not be changed when adding prefix indications for an SEI type for which prefix indications have already been defined. Multiple SEI messages for signaling the SEI prefix indications for one particular SEI type may be needed, however.

In various examples, alternative techniques can be used to define the persistence scope of SEI messages.

In a first example the persistence scope of SEI messages can be the same as that of the active SPS. In this example, when the active SPS applies to multiple CVS's the persistence scope of the SEI message will also be the multiple CVS's.

In a second example, the persistence scope can be specified in the bitstream. In this example, SEI messages may need to be changed when multiple bitstreams are spliced into one bitstream.

In various examples, alternative wording for the semantics can be used.

In a first example, assertive wording such as "indicates whether certain types of SEI messages are present or absent" can be used, for example, in the semantics for the SEI manifest.

As a second example, non-assertive wording (as seen from a decoder's point of view), such as "indicates whether certain types of SEI messages may be assumed to be present or absent" can be used.

As a third example, non-assertive wording (as seen from the encoder's point of view), such as "indicates whether certain types of SEI messages are stated by the encoder to be present or absent" can be used. In this example, it could be further stated that a decoder may make decisions on how to process this information, though how to process the information can be left up to the decoder.

In the case of the first example above, there may be instances when an SEI manifest may indicate that a particular type of SEI message is present in a bitstream, but the SEI messages of that type may have been removed. In these examples, the semantics of the bitstream may be incorrect, and the bitstream may be non-conforming With the second and third examples above, removal of SEI messages in the bitstream does not cause the bitstream to be non-conforming. When, for example, the SEI manifest indicates that a particular type of SEI message is present in the bitstream but the SEI message was removed (e.g., after the bitstream is encoded), the non-assertive wording of the second and third examples would not become incorrect. In the third example, the non-assertive wording is less stringent than the non-assertive wording of the second example.

Essential and Non-Essential SEI Messages

Various SEI messages have been defined, for example in Annex D of the HEVC specification, in draft amendments to the HEVC specification (such as the draft amendment text in JCTVC-Z1005), and in Annex F and subsequent annexes of the specification.

Provided below are examples of SEI messages that may be considered as including essential information. These SEI messages, when present (e.g., natively present or contained in a nesting SEI message) may have a direct impact on the rendering of decoded pictures. While these SEI messages may be considered essential, whether SEI messages that include this information is labeled essential is left to the encoder.

The frame packing arrangement SEI message
The display orientation SEI message
The segmented rectangular frame packing arrangement SEI message
The omnidirectional projection indication SEI message The following SEI messages, when present (e.g., natively present or contained in a nesting SEI message), may affect the rendering of decoded pictures. These SEI messages are also examples of SEI messages that could be considered essential.

The film grain characteristics SEI message
The post-filter hint SEI message
The tone mapping information SEI message
The no display SEI message
The no display SEI message
The mastering display colour volume SEI message
The chroma resampling filter hint SEI message
The knee function information SEI message
The colour remapping information SEI message
The deinterlaced picture information SEI message
The content light level information SEI message
The alternative transfer characteristics SEI message
The ambient viewing environment SEI message
The content colour volume SEI message Other SEI messages that are less likely to affect the rendering of decoded picture, may or may not be included into the list of essential SEI messages, at the discretion of the encoder. For example, the encoder may determine that a user data registered by Recommendation ITU-T T.35 SEI message or a user data unregistered SEI message carries essential information and consequently include that SEI payload type into the list of essential SEI messages and provide some additional information to sufficiently indicate the required processing capability.

Systems Level Exposure of Essential Supplemental Information

In various implementations, SEI messages such as those described above (e.g., the ESI SEI, NSI SEI, SEI manifest SEI, and SEI prefix SEI, which will be referred to herein collectively as essential information carrying SEI) can be placed in encapsulation formats such that a decoder can have access to these SEI early in the process of decoding a video segment. Encapsulation formats include, for example, file formats, streaming formats, network formats, and other formats.

File format standards can define the format for packing and unpacking video (and possibly also audio) data into one or more files. File format standards include International Organization for Standardization (ISO) base media file format (ISOBMFF, defined in ISO/IEC 14496-12) and other file formats derived from the ISOBMFF, including Motion Pictures Experts Group (MPEG) MPEG-4 file format (defined in ISO/IEC 14496-15), 3rd Generation Partnership Project (3GPP) file format (defined in 3GPP TS 26.244) and Advanced Video Coding (AVC) file format and High Efficiency Video Coding (HEVC) file format (both defined in ISO/IEC 14496-15). The draft texts of recent new editions for ISO/IEC 14496-12 and 14496-15 are available at http://phenix.int-evey.fr/mpeg/doc_end_user/documents/111_Geneva/wg11/w15177-v6-w15177.zip and http://phenix.int-evry.fr/mpeg/doc_end_user/documents/112_Warsaw/wg11/w15479-v2-w15479.zip, respectively.

The ISOBMFF is used as the basis for many codec encapsulation formats (e.g., the AVC file format or any other suitable codec encapsulation format), as well as for many multimedia container formats (e.g., the MPEG-4 file format, the 3GPP file format (3GPP), the Digital Video Broadcasting (DVB) file format, or any other suitable multimedia container format). ISOBMFF-based file formats can be used for continuous media, which is also referred to as streaming media.

In addition to continuous media (e.g., audio and video), static media (e.g., images) and metadata can be stored in a file conforming to ISOBMFF. Files structured according to the ISOBMFF may be used for many purposes, including local media file playback, progressive downloading of a remote file, as segments for Dynamic Adaptive Streaming over HTTP (DASH), as containers for content to be streamed (in which case the containers include packetization instructions), for recording of received real-time media streams, or other uses.

The ISOBMFF and its derived file formats (e.g., the AVC file format or other derived file formats) are widely used for storage and encapsulation of media content (e.g., including video, audio, and timed text) in many multimedia applications. In various implementations, the ISOBMFF file format can be used to provide essential information carrying SEI message ahead of the video data to which the information applies. For example, essential information carrying SEI can be included in a sample entry, as discussed further below.

Figure 3:
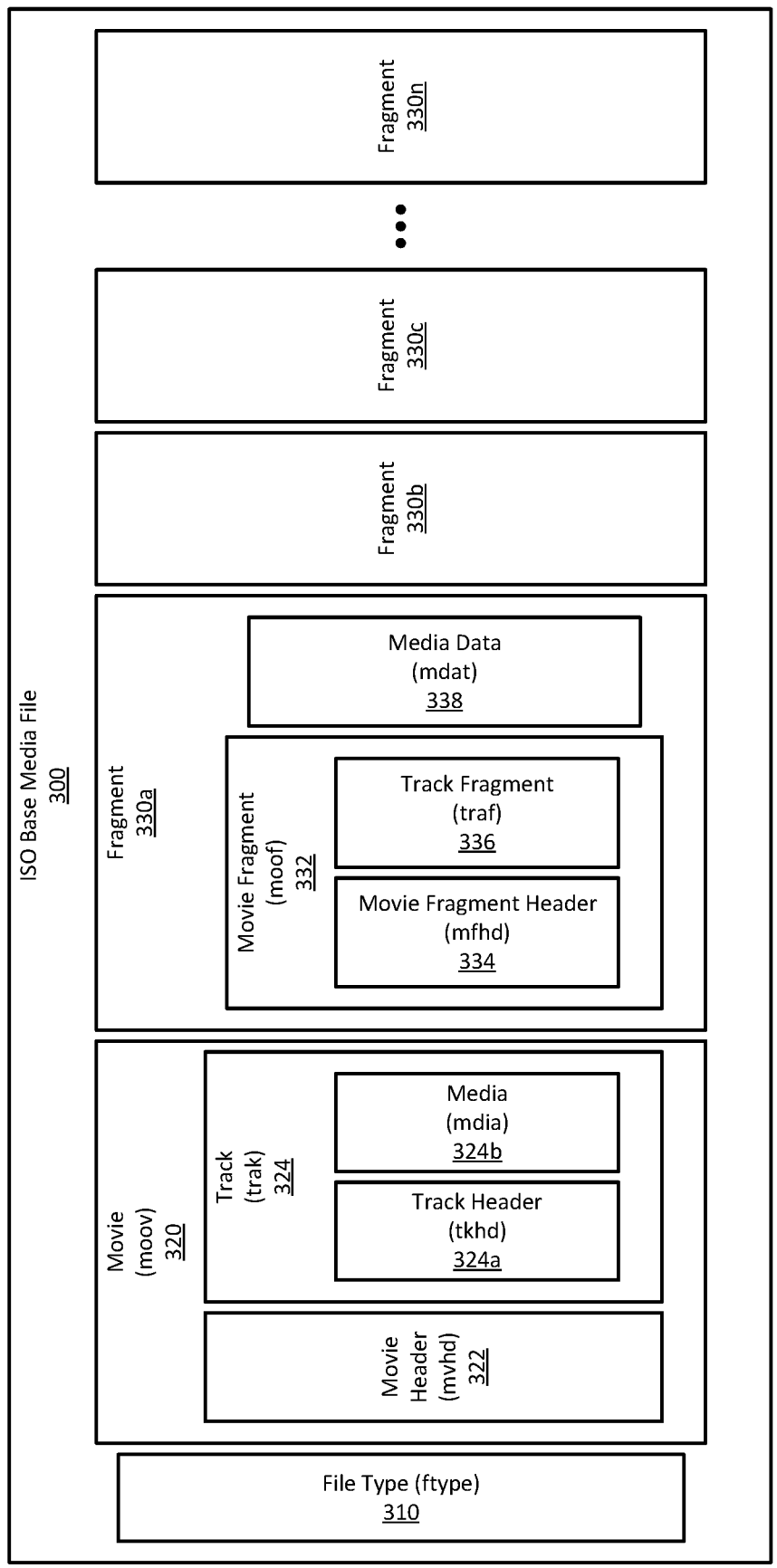
FIG. 3 illustrates an example of an ISO base media file.

FIG. 3 illustrates an example of an ISO base media file 300 that contains data and metadata for a video presentation, formatted according to the ISOBMFF. The ISOBMFF is designed to contain timed media information in a flexible and extensible format that facilitates interchange, management, editing, and presentation of the media. Presentation of the media may be "local" to the system containing the presentation or the presentation may be via a network or other stream delivery mechanism.

A "presentation," as defined by the ISOBMFF specification, is a sequence of pictures, often related by having been captured sequentially by a video capture device, or related for some other reason. Herein, a presentation may also be referred to as a movie or a video presentation. A presentation may include audio. A single presentation may be contained in one or more files, with one file containing the metadata for the whole presentation. The metadata includes information such as timing and framing data, descriptors, pointers, parameters, and other information that describes the presentation. Metadata does not include the video and/or audio data itself. Files other than the file that contains the metadata need not be formatted according to the ISOBMFF, and need only be formatted such that these files can be referenced by the metadata.

The file structure of an ISO base media file is object-oriented, and the structure of an individual object in the file can be inferred directly from the object's type. The objects in an ISO base media file are referred to as "boxes" by the ISOBMFF specification. An ISO base media file is structured as a sequence of boxes, which can contain other boxes. Boxes generally include a header that provides a size and a type for the box. The size describes the entire size of the box, including the header, fields, and all boxes contained within the box. Boxes with a type that is not recognized by a player device are typically ignored and skipped.

As illustrated by the example of FIG. 3, at the top level of the file, an ISO base media file 300 can include a file type box 310, a movie box 320, and one or more movie fragments 330a, 330n. Other boxes that can be included at this level but that are not represented in this example include free space boxes, metadata boxes, and media data boxes, among others.

An ISO base media file can include a file type box 310, identified by the box type "ftyp." The file type box 310 identifies an ISOBMFF specification that is the most suitable for parsing the file. "Most" in this instance means that the ISO base media file 300 may have been formatted according to a particular ISOBMFF specification, but is likely compatible with other iterations of the specification. This most suitable specification is referred to as the major brand. A player device can use the major brand to determine whether the device is capable of decoding and displaying the contents of the file. The file type box 310 can also include a version number, which can be used to indicate a version of the ISOBMFF specification. The file type box 310 can also include a list of compatible brands, which includes a list of others brands with which the file is compatible. An ISO base media file can be compatible with more than one major brand.

When an ISO base media file 300 includes a file type box 310, there is only one file type box. An ISO base media file 300 may omit the file type box 310 in order to be compatible with older player devices. When an ISO base media file 300 does not include a file type box 310, a player device can assume a default major brand (e.g. "mp41"), minor version (e.g., "0"), and compatible brand (e.g., "mp41"). The file type box 310 is typically placed as early as possible in the ISO base media file 300.

An ISO base media file can further include a movie box 320, which contains the metadata for the presentation. The movie box 320 is identified by the box type "moov." ISO/IEC 14496-12 provides that a presentation, whether contained in one file or multiple files, can include only one movie box 320. Frequently, the movie box 320 is near the beginning of an ISO base media file. The movie box 320 includes a movie header box 322, and can include one or more track boxes 324 as well as other boxes.

The movie header box 322, identified by the box type "mvhd," can include information that is media-independent and relevant to the presentation as a whole. For example, the movie header box 322 can include information such as a creation time, a modification time, a timescale, and/or a duration for the presentation, among other things. The movie header box 322 can also include an identifier that identifies the next track in the presentation. For example, the identifier can point to the track box 324 contained by the movie box 320 in the illustrated example.

The track box 324, identified by the box type "trak," can contain the information for a track for a presentation. A presentation can include one or more tracks, where each track is independent of other tracks in the presentation. Each track can include the temporal and spatial information that is specific to the content in the track, and each track can be associated with a media box. The data in a track can be media data, in which case the track is a media track, or the data can be packetization information for streaming protocols, in which case the track is a hint track. Media data includes, for example, video and audio data. In the illustrated example, the example track box 324 includes a track header box 324a and a media box 324b. A track box can include other boxes, such as a track reference box, a track group box, an edit box, a user data box, a meta box, and others.

The track header box 324a, identified by the box type "tkhd," can specify the characteristics of a track contained in the track box 324. For example, the track header box 324a can include a creation time, modification time, duration, track identifier, layer identifier, group identifier, volume, width, and/or height of the track, among other things. For a media track, the track header box 324a can further identify whether the track is enabled, whether the track should be played as part of the presentation, or whether the track can be used to preview the presentation, among other things. Presentation of a track is generally assumed to be at the beginning of a presentation. The track box 324 can include an edit list box, not illustrated here, that can include an explicit timeline map. The timeline map can specify, among other things, an offset time for the track, where the offset indicates a start time, after the beginning of the presentation, for the track.

In the illustrated example, the track box 324 also includes a media box 324b, identified by the box type "mdia." The media box 324b can contain the objects and information about the media data in the track. For example, the media box 324b can contain a handler reference box, which can identify the media type of the track and the process by which the media in the track is presented. As another example, the media box 324b can contain a media information box, which can specify the characteristics of the media in the track. The media information box can further include a table of samples, where each sample describes a chunk of media data (e.g., video or audio data) including, for example, the location of the data for the sample. The data for a sample is stored in a media data box, discussed further below. As with most other boxes, the media box 324b can also include a media header box.

In the illustrated example, the example ISO base media file 300 also includes multiple fragments 330a, 330b, 330c, 330n of the presentation. The fragments 330a, 330b, 330c, 330n are not ISOBMFF boxes, but rather describe a movie fragment box 332 and the media data box 338 that is referenced by the movie fragment box 332. The movie fragment box 332 and media data boxes 338 are top-level boxes, but are grouped here to indicate the relationship between a movie fragment box 332 and a media data box 338.

A movie fragment box 332, identified by the box type "moof," can extend a presentation by including additional information that would otherwise be stored in the movie box 320. Using movie fragment boxes 332, a presentation can be built incrementally. A movie fragment box 332 can include a movie fragment header box 334 and a track fragment box 336, as well as other boxes not illustrated here.

The movie fragment header box 334, identified by the box type "mfhd," can include a sequence number. A player device can use the sequence number to verify that the fragment 330a includes the next piece of data for the presentation. In some cases, the contents of a file, or the files for a presentation, can be provided to a player device out of order. For example, network packets can frequently arrive in an order other than in the order that the packets were originally transmitted. In these cases, the sequence number can assist a player device in determining the correct order for fragments.

The movie fragment box 332 can also include one or more track fragment boxes 336, identified by the box type "traf" A movie fragment box 332 can include a set of track fragments, zero or more per track. The track fragments can contain zero or more track runs, each of which describes a contiguous run of samples for a track. Track fragments can be used to add empty time to a track, in addition to adding samples to the track.

The media data box 338, identified by the box type "mdat," contains media data. In video tracks, the media data box 338 would contain video frames. A media data box can alternatively or additionally include audio data. A presentation can include zero or more media data boxes, contained in one or more individual files. The media data is described by metadata. In the illustrated example, the media data in the media data box 338 can be described by metadata included in the track fragment box 336. In other examples, the media data in a media data box can be described by metadata in the movie box 320. The metadata can refer to a particular media data by an absolute offset within the file 300, such that a media data header and/or free space within the media data box 338 can be skipped.

Other fragments 330b, 330c, 330n in the ISO base media file 300 can contain boxes similar to those illustrated for the first fragment 330a, and/or can contain other boxes.

The ISOBMFF includes support for streaming media data over a network, in addition to supporting local playback of the media. The file or files that include one movie presentation can include additional tracks, called hint tracks, which contain instructions that can assist a streaming server in forming and transmitting the file or files as packets. These instructions can include, for example, data for the server to send (e.g., header information) or references to segments of the media data. A file can include separate hint tracks for different streaming protocols. Hint tracks can also be added to a file without needing to reformat the file.

In the example media file 300 illustrated in FIG. 3, essential information carrying SEI can be included, for example, in a sample entry. For example, the SEI NAL unit containing are essential information carrying SEI message can be directly included in the array of SEI NAL units in the decoder configuration record of an HEVC sample entry. In some cases, the SEI NAL unit containing an essential information carrying SEI message can be included as the first SEI NAL unit of the SEI NAL unit array in the decoder configuration record. In various examples, essential information carrying SEI messages can, alternatively or additionally, be carried in higher level boxes, such as the movie header box 322 or the track header box 324a, among others.

Streaming encapsulation formats, such as DASH can also be used to present essential information carrying SEI messages to a decoder. DASH, which is specified in ISO/IEC 23009-1, is a standard for HTTP (adaptive) streaming applications. DASH specifies a format referred to as the media presentation description (MPD), also known as manifest, and a media segment format. The MPD describes the media available on a server and enables a DASH client to autonomously download a particular media version at a particular time in the media.

DASH based HTTP streaming can include the following steps:

1) A client obtains the MPD of a streaming content (e.g. a movie). The MPD includes information on different alternative representations, such as, for example, bit rate, video resolution, frame rate, audio language, of the streaming content, as well as the URLs of the HTTP resources (e.g., the initialization segment and the media segments).
2) Based on information in the MPD and the client's local information, (e.g., network bandwidth, decoding/display capabilities, and/or user preference)e, the client requests the desired representation(s), one segment (or a part thereof) at a time.
3) When the client detects a network bandwidth change, the requests segments of a different representation with a better-matching bitrate, ideally starting from a segment that starts with a random access point.

During an HTTP streaming session, to respond to the user request to seek backward to a past position or forward to a future position, the client requests past or future segments starting from a segment that is close to the desired position. From that point, the client can start at a random access point. The user may also request to fast-forward the content, which may be realized by requesting data sufficiently for decoding only the intra-coded video pictures or only a temporal subset of the video stream.

Figure 4:
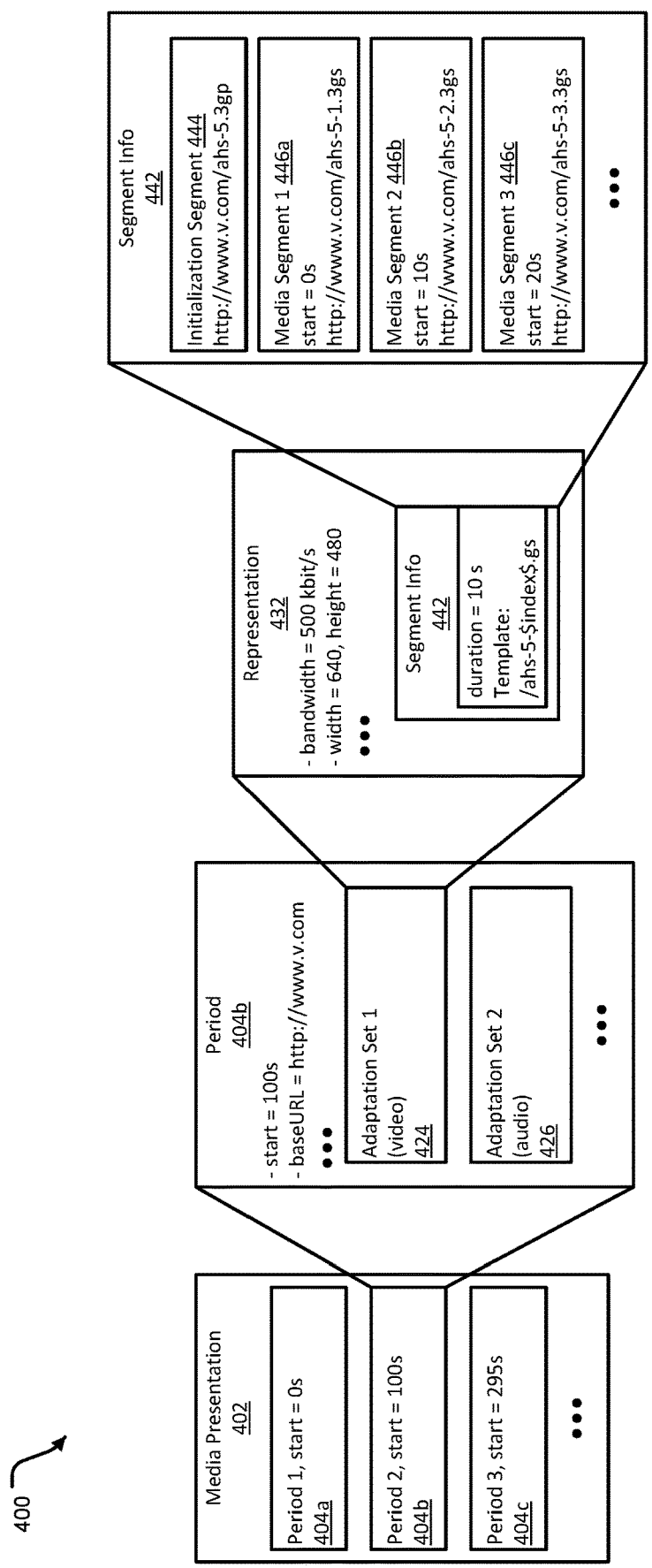
FIG. 4 illustrates an example of a DASH presentation for streaming video content.

FIG. 4 illustrates an example of a DASH presentation 400 for streaming video content. The video content is contained in a media presentation 402, which can describe a contiguous video stream. The media presentation 402 can include a media presentation description (MPD), which can also be referred to as a manifest. The MPD is a document, formatted using for example eXtensible Markup Language (XML), that contains information about media segments in the media presentation 402. This information can include, for example, the relationships between segments and information that can be used to choose between the segments. The MPD can also include other data that client devices (e.g., devices receiving the content) can use.

The media presentation 402 can be divided into periods 404a-404c. A period, as defined by DASH, is an interval of time within the media presentation 402. The presentation thus consists of a contiguous sequence of periods 404a-404c. A period 404a-404c can be described by, for example, a start time, where the start time indicates a time at which the interval of time in the period starts. Stated another way, the start time is an offset from time zero.

Within a period 404b (e.g., Period 2 in the illustrated example), media content can have a consistent set of encodings, including, for example, an average bitrate, a language, a caption setting, a subtitle setting, etc. The period 404b can also provide a source (e.g., a base Uniform Resource Locator (URL)) where the content can be streamed from. The content in the period 404b can be arranged into adaptation sets 424, 426. An adaptation set represents a set of interchangeable encoded versions of one or more media content components. For example, a period may include one adaptation set 424 for the main video component and a separate adaptation set 426 for the main audio component. When there is other content available, such as captions or audio descriptions, each of these can have a separate adaptation set.

An adaptation set (e.g., the video adaptation set 424) can contain multiple alternate representations 432. A representation describes a deliverable encoded version of one or several media content components. Any single representation within an adaptation set can be used to render the media content components in the period. Different representations in one adaptation sent may be considered perceptually equivalent, meaning that a client device can switch dynamically from one representation to another representation within the adaptation set in order to adapt to network conditions or other factors. For example, each representation can have a particular bandwidth, and frame height and width, as well as other information such as a frame rate or encoding type. A representation 432 can further include segment information 442 that describes the segments in the media presentation 402.

The segment information 442 can describe an initialization segment 444 and one or more media segments 446a-446c. The initialization segment 444 can include some content that precedes the media itself. Each media segment 446a-446c includes a portion of the overall period 404b. The media segments 446a-446c can be described by a start time relative to the start of the period 404b, and a source location (e.g., a URL).

ISOBMFF specifies the sub-parameters for the MIME type 'codecs' parameter for AVC and HEVC and their extensions. When streaming content using DASH, the MIME type parameter can be provided as an attribute (e.g., @mimeType) in the MPD. The SEI NAL unit containing an essential information carrying SEI message can be included as part of the 'codecs' parameter or a different MIME type parameter, thus enabling these SEI messages to be extractable from the MPD through the @mimeType attribute.

Figure 5:
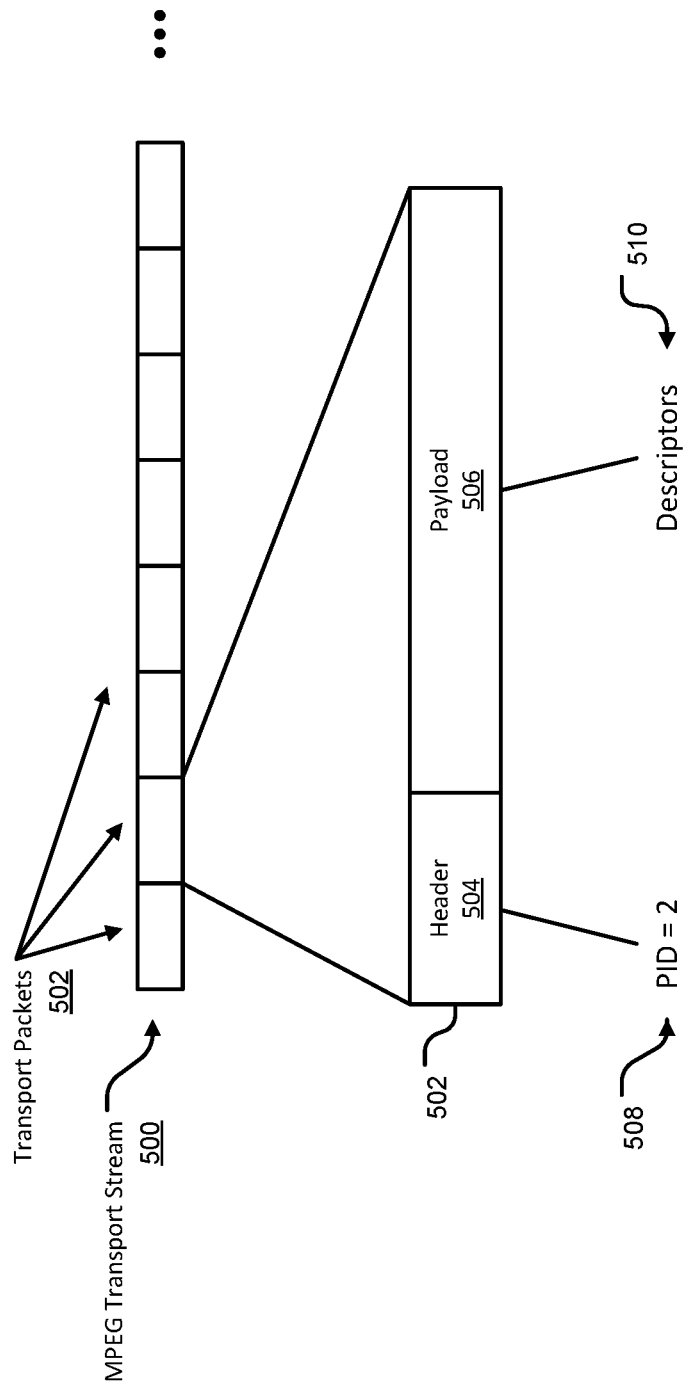
FIG. 5 illustrates an example of an MPEG transport stream.

The MPEG transport stream (MPEG-TS) is an encapsulation format by which an encoded bitstream can be transmitted over a network. FIG. 5 illustrates an example of an MPEG transport stream 500. MPEG-TS is a container format used to transmit and store audio, video, and programming data. MPEG-TS specifies a container format encapsulating packetized elementary streams, with error correction and stream synchronization features for maintaining transmission integrity when the signal is degraded. MPEG-TS is intended for streamlining over unreliable transmission mediums, such as terrestrial and satellite broadcast.

An MPEG transport stream 500 includes multiple transport packets 502. A packet is a basic unit of data in a transport stream. The transport stream itself is a sequence of packets, without any global header. Each packet 502 includes a header 504 and a payload 506. The header 504 provides information about the packet 502, including, for example, describing the contents of the payload, the packets sequence with respect to other packets, error information, and so on.

Among other fields, the header 504 can include a packet identifier 508 (PID). The packet identifier 508 can describe the data included in the payload 506. For example, PID=2 indicates that the payload 506 includes some or all of a transport stream descriptor table (TSDT). The transport stream descriptor table can contain descriptors 510 relating to the transport stream 500.

In some examples, essential information carrying SEI messages can be included as part of a descriptor that contains video codec profile and level information, as a similar descriptor. By being included among these descriptors, a decoder can parse essential information carrying SEI messages along with essential decoding information.

Some example applications may be using Real-time Transfer Protocol (RTP) for media transport, and Session Description Protocol (SDP) to signal information about the media. SDP can be used to describe multimedia communication sessions. Such descriptions can be used, for example, for session announcement, session invitation, and parameter negotiation. SDP is not used to deliver the media itself, but can be used between endpoints for negotiation of the media type, format, and associated properties. A set of properties and parameters are often referred to as a session profile. SDP was originally a component of the Session Announcement Protocol (SAP), but found other uses in conjunction with Real-time Transfer Protocol (RTP), Real-time Streaming Protocol (RTSP), Session Initiation Protocol (SIP) and as a standalone format for describing multicast sessions. SDP is described in RFC 4566.

Figure 6:
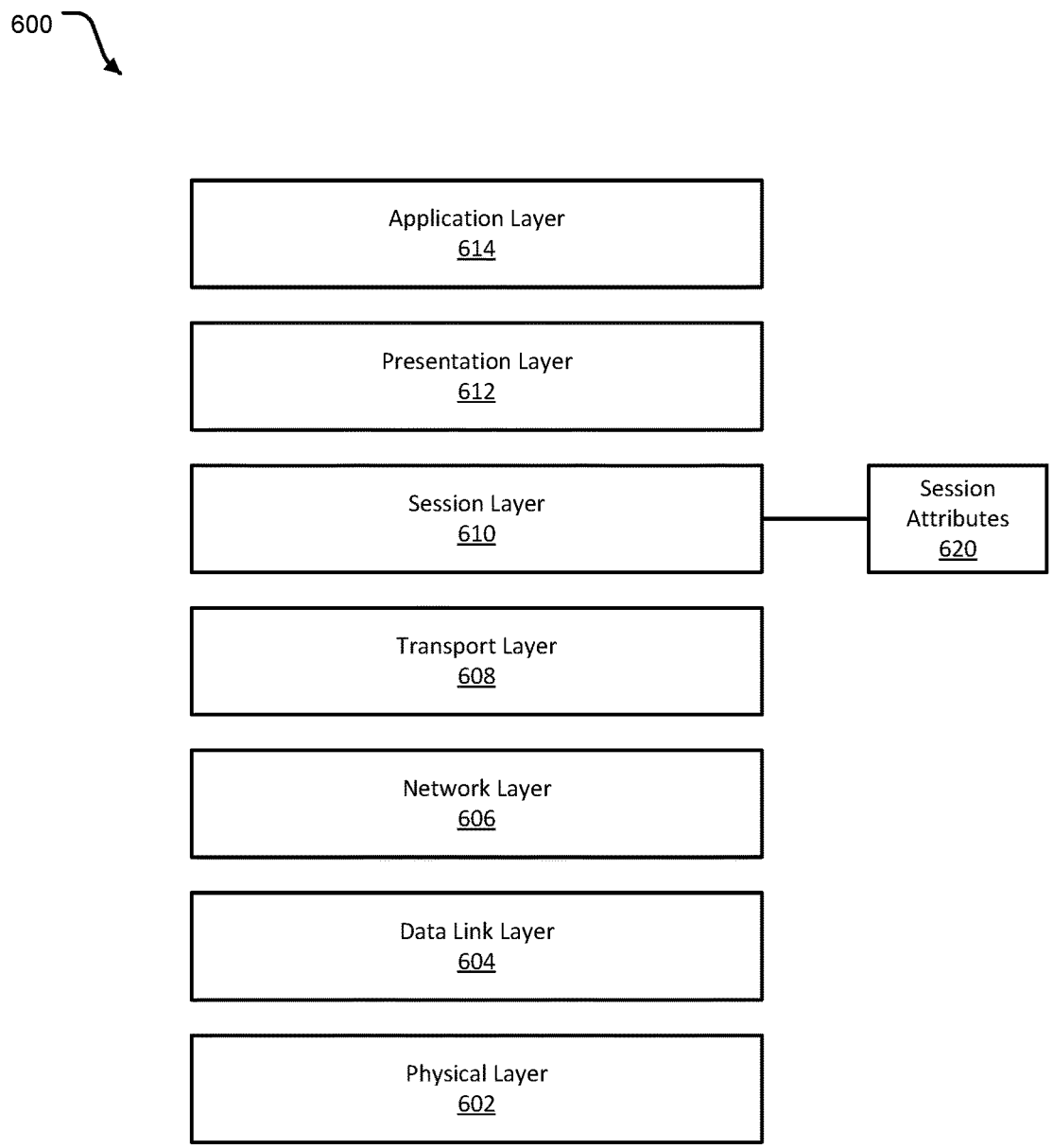
FIG. 6 illustrates an example of the Open Systems Interconnect (OSI) model 600 for network communications.

FIG. 6 illustrates an example of the Open Systems Interconnect (OSI) model 600 for network communications. Within this model, SDP is implemented in the session layer 610, where connection management, error recovery, security, remote operation, and other functions occur. Session attributes 620 can be exchanged in the session layer 610.

The OSI model 600 standardizes communication functions, and compliance enables interoperability between diverse communication systems. Each layer in the model 600 serves the layer above and is served by the layer below. The physical layer 602 defines transmission and reception of raw bit streams over a physical medium. The data link layer 604 defines reliable transmission of data frames between two nodes. Operations such as physical addressing are handled in the data link layer 604. The network layer 606 defines the structure and management of a multi-node network, including addressing, routing, and traffic control. Operations such as packet fragmentation and logical addressing occur in the network layer 606. The transport layer 608 defines reliable transmission of data segments between points on a network, including segmentation, acknowledgment, and multiplexing. Operations such as end-to-end connection management, message segmentation, message sequencing, reliability, and flow control can occur in the transport layer 608. The session layer 610 defines management of sessions, which are continuous exchanges of information in the form of multiple back-to-back transmissions between two nodes. As noted, previously, operations such as connection management, error recovery, security, and remote operation can occur in the session layer 610. The presentation layer 612 defines translation of data between a networking service and an application, including character encoding, data compression, and encryption and/or decryption. The application layer 614 includes high-level Application Programming Interfaces (APIs), including resource sharing, remote file access, and other operations.

In some examples, essential information carrying SEI messages can be included in an SDP file as an SDP attribute. Provided below is an example of the fields in a session description. Optional fields are specified with "=*" and in the below example, essential information carrying SEI messages can be specified using the session attribute lines and/or the media attribute lines.

Session Description
  v=(protocol version number, currently only 0)
  o=(originator and session identifier: username, id, version number, network address)
  s=(session name: mandatory with at least one UTF-8-encoded character)

i=* (session title or short information)
u=* (URI of description)
e=* (zero or more email address with optional name of contacts)
p=* (zero or more phone number with optional name of contacts)
c=* (connection information—not required if included in all media)
b=* (zero or more bandwidth information lines)
One or more Time descriptions ("t=" and "r=" lines; see below)
z=* (time zone adjustments)
k=* (encryption key)
a=* (zero or more session attribute lines)
Zero or more Media descriptions (each one starting by an "m=" line; see below)
Time Description
t=(time the session is active)
r=* (zero or more repeat times)
Media Description
m=(media name and transport address)
i=* (media title or information field)
c=* (connection information—optional if included at session level)
b=* (zero or more bandwidth information lines)
k=* (encryption key)
a=* (zero or more media attribute lines—overriding the Session attribute lines)

Figure 7:
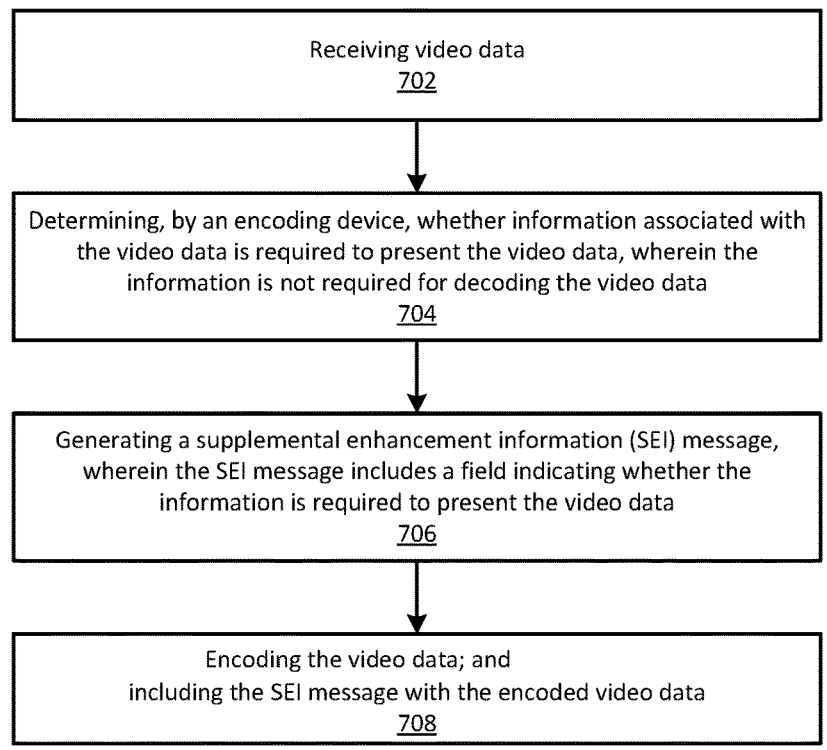
FIG. 7 illustrates an example of a process for encoding video data.

FIG. 7 illustrates an example of a process 700 for encoding video data. The method can be implemented by a video coding system, such as are described herein.

At 702, the process 700 includes receiving video data. The video data can be received, for example, for a video capture device of a video coding system. As another example, the video data can be received from a storage device, such as a hard drive or flash memory device, and/or over a network.

At 704, the process 700 includes determining, by an encoding device, whether information associated with the video data is required to present the video data, wherein the information is not required for decoding the video data. The encoding device can be part of the video coding system. The information can be received at the same time that the video data is received. Alternatively, the information can be provided to the encoding device before the encoding device receives the video data. For example, the encoding device can be configured in advance with the information. Alternatively, the information can be a component of the video data.

In various examples, the information, when used by a decoding device, can enable the decoding device to process and/or display the video data in a certain way. For example, the information can include a frame packing arrangement, which indicates the manner in which a picture has been packed into a frame before the frame was encoded. As another example, the information can include a display orientation, which indicates a desired orientation (e.g., a rotation) of the display in which the video data is to be presented. As another example, the information an include a segmented rectangular frame packing arrangement, which can indicate that the picture was segmented before being packed into a frame, and the manner in which the segments were packed into the frame, before the frame was encoded. As another example, the information can include an omnidirectional projection indication, which can indicate to a decoding device that the video data is 360-degree video data. In these and other examples, in some cases, the decoding device can use the information to determine whether the decoding device is capable of displaying the video data.

In various examples, the encoding device is configured with one or more parameters the encoding device can use to determine whether the information is required to present the video data. These parameters can include, for example, film grain characteristics or tone mapping to apply to the video data, a color volume or color mapping used to produce the video data, and/or a frame packing configuration, among other things.

A 706, the process 700 includes generating a supplemental enhancement information (SEI) message, wherein the SEI message includes a field indicating whether the information is required to present the video data. For example, the SEI message can be an SEI manifest message, which can include a field identifying types of SEI messages included with the video data, and a field indicating the essentiality of each of these SEI messages. As another example, the SEI message can be a prefix SEI message that may include essential information. As another example, the SEI message can be an ESI SEI message. As another example, the SEI message can be an NSI SEI message.

In some examples, a syntax element of the SEI message indicates a type of the SEI message. In these examples, a decoding device can use the syntax element to identify the SEI message as different from an SEI message such as is defined in Table 1.

At 708, the process 700 includes encoding the video data. The video data can be encoded using, for example, the HEVC or AVC standards, or another video coding standard. In various examples, encoding the video data can produce an encoded video bitstream, where the encoded video bitstream includes a compressed version of the video data.

At 710, the process 700 includes including the SEI message with the encoded video data. In some examples, the SEI message can be included in the encoded video data. In some examples, the SEI message can be included together with the encoded video data in an encapsulated format.

For example, the process 700 can include writing the encoded video data and the SEI message to a file, wherein the encoded video data and the SEI message are written to the file according to a file format. In these examples, the process 700 can further include using the file format to place the SEI message in the file where the SEI can be read before the encoded video data is read.

As another example, the process 700 can include encapsulating the encoded video data for streaming, wherein the encoded video data is encapsulated according to a streaming format. In this example, the process 700 can further include generating, according to the streaming format, a description of encoded video data, wherein the description includes the SEI message.

As another example, the process 700 can include encapsulating the encoded video data for transmission over a network, wherein the encoded video data is encapsulated according to a container format. In this example, the process 700 can further include generating, according to the container format, a first packet, wherein a payload portion of the first packet includes the SEI message as a descriptor. The process 700 can further include generating one or more packets including the encoded video data, wherein the one or more packets follow the first packet in transmission order.

As another example, the process 700 can further include encapsulating the encoded video data for transmission over a network, wherein the encoded video data is encapsulated according to a real-time transfer protocol. In this example, the process 700 can further include generating, according to a session description protocol, a session description, wherein the session description includes the SEI message.

In some examples, the encoded device determines that the information is required to present the video data. In these examples, the field in the SEI message can indicate that essential information is included in the encoded video data, or is provided with the encoded video data. In these examples, a decoding device can use the SEI message to identify and locate the essential information.

In some examples, the encoding device determines that the information is not required to present the video data. In these examples, the field in the SEI message can indicate that no essential information is included in or with the encoded video data.

In some examples, the information is included with the encoded video data. For example, the information can be included in the SEI message. Alternatively or additionally, the information can be included in one or more additional SEI messages. In some examples, the additional SEI messages can identify the type information that each SEI message carries. In some examples, each of the additional SEI messages can indicate the essentially of the information carried by each SEI message. In some examples, the essentiality of each SEI message is indicate in the SEI message generated as discussed above.

FIG. 8 illustrates an example of a process 800 for decoding video data. The process 800 can be implemented, for example, by a video coding device, such as is described herein.

At 802, the process 800 includes receiving, at a decoding device, an encoded video bitstream, a supplemental enhancement information (SEI) message, and information associated with the encoded video bitstream. In some examples, the decoding device is part of the video coding device. In some examples, the decoding device receives the encoded video bitstream from a storage device and/or over a network. In some examples, the decoding device receives the encoded video bitstream from an encoding device.

In some examples, the SEI message and/or the information associated with the encoded video bitstream are included in the encoded video bitstream. In some examples, the SEI message and/or the information are provided with the encoded video bitstream, for example in an encapsulated format that includes the encoded video bitstream.

For example, encoded video bitstream, the SEI message, and the information associated with the encoded video bitstream can be received in a file, where the file is formatted according to a file format. In this example, the file format can provide that the SEI message be in a part of the file that is read by the decoding device before a part of the file that includes the encoded video bitstream.

As another example, the encoded video bitstream, the SEI message, and the information associated with the encoded video bitstream can be received in a data stream, where the data stream is formatted according to a streaming format. In this example, the decoding device can read, from the data stream, a description of the encoded video data, where the description includes the SEI message.

As another example, the encoded video bitstream, the SEI message, and the information associated with the encoded video bitstream can be received in a plurality of network packets. In this example, the decoding device can read the SEI message from a payload portion of a first packet from the plurality of network packets. The SEI message can, for example, be provided as a descriptor in the payload. In this example, the decoding device can further read the encoded video data from one or more packets from the plurality of network packets, where the one or more packets follow the first packet in transmission order.

As another example, the encoded video bitstream, the SEI message, and the information associated with the encoded video bitstream can received over a network. In this example, the encoded video bitstream can be encapsulated according to a real-time transfer protocol, and the SEI message can be included in a session description, where the session description is formatted according to a session description protocol.

At 804, the process 800 includes determining using the SEI message, whether the information is required to present video data in the encoded video bitstream, wherein the information is not required for decoding the video data, and wherein the SEI message includes a field indicating whether the information is required to present the video data.

In some examples, a syntax element of the SEI message indicates a type of the SEI message. In these examples, the decoding device can use the syntax element to determine that the SEI message can include an indication of whether the information. is required to present the video data.

In some examples, the information is included in the SEI message, and/or in one or more additional SEI message included with the encoded video data. For example, the SEI message can include a listing of the types of SEI messages included with the encoded video data. In this example, the listing can further indicate the essentiality of the data included in each of the SEI messages. As another example, the SEI message type can indicate whether the SEI message includes or does not include essential information.

At 806, the process 800 includes decoding the encoded video bitstream to produce video data, wherein the encoded video bitstream is decoded according to a result of determining whether the information is required to present the video data.

In some examples, the decoding device determines that the information is required to present the video data. In these examples, the decoding device configures the video data according to the information. For example, upon decoding the encoded video data, the decoding device can rearrange the contents of a video frame according to a frame packing format. As another example, the decoding device can arrange a video frame for display using a 360-degree display. As another example, the decoding device can provide color information to a display device, where the video data can be displayed using the color information.

In some examples, the decoding device determines that the information is not required to present the video data. In these examples, the decoding device can decode the encoded video data without using the information.

In some examples, the processes 700, 800 may be performed by a computing device or an apparatus, such as the video coding system 100. For example, the processes 700, 800 can be performed by the video coding system 100 shown in FIG. 1. In some cases, the computing device or apparatus may include a processor, microprocessor, microcomputer, or other component of a device that is configured to carry out the steps of processes 700, 800. In some examples, the computing device or apparatus may include a camera configured to capture video data (e.g., a video sequence) including video frames. For example, the computing device may include a camera device (e.g., an IP camera or other type of camera device) that may include a video codec. In some examples, a camera or other capture device that captures the video data is separate from the computing device, in which case the computing device receives the captured video data. The computing device may further include a network interface configured to communicate the video data. The network interface may be configured to communicate Internet Protocol (IP) based data.

The processes 700, 800 are illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 700, 800 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The methods and operations discussed herein may be implemented using compressed video, and may be implemented in an example video encoding and decoding system (e.g., system 100). In some examples, a system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various examples have been described.

Figure 9:
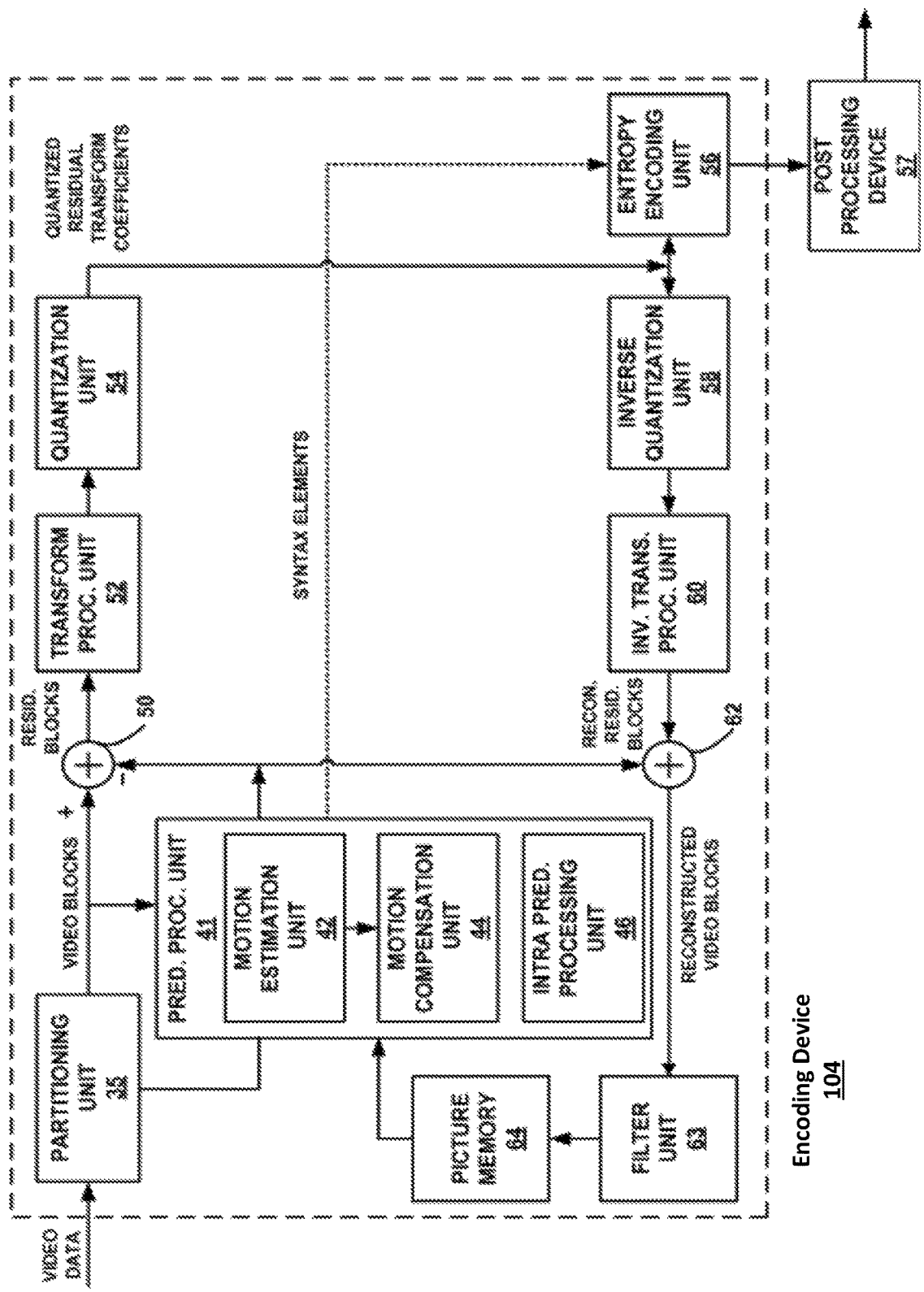
FIG. 9 is a block diagram illustrating an example encoding device.
Figure 10:
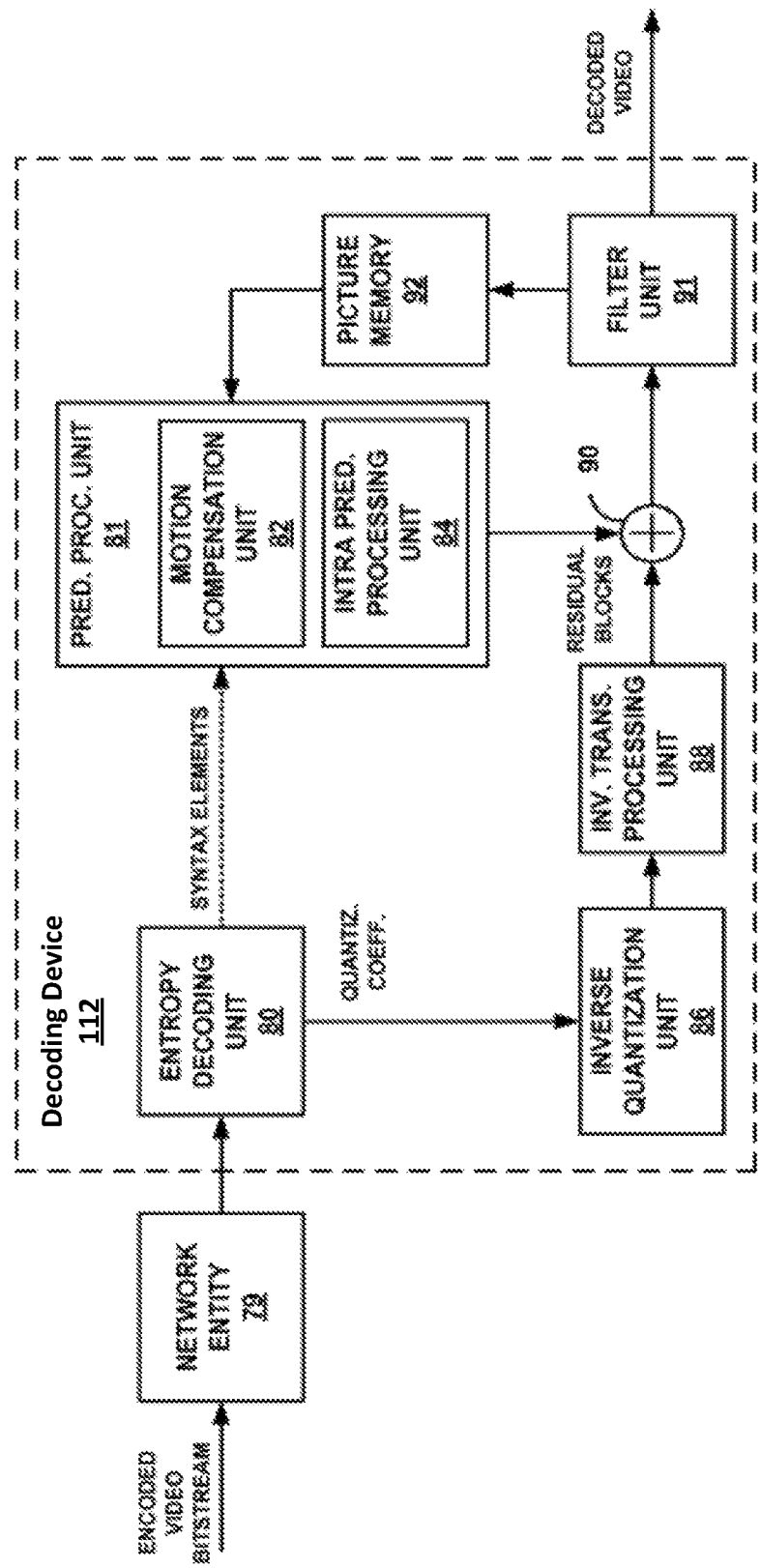
FIG. 10 is a block diagram illustrating an example decoding device.

Specific details of the encoding device 104 and the decoding device 112 are shown in FIG. 9 and FIG. 10, respectively. FIG. 9 is a block diagram illustrating an example encoding device 104 that may implement one or more of the techniques described in this disclosure. Encoding device 104 may, for example, generate the syntax structures described herein (e.g., the syntax structures of a VPS, SPS, PPS, or other syntax elements). Encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 9 as being an in loop filter, in other configurations, filter unit 63 may be implemented as a post loop filter. A post processing device 57 may perform additional processing on encoded video data generated by the encoding device 104. The techniques of this disclosure may in some instances be implemented by the encoding device 104. In other instances, however, one or more of the techniques of this disclosure may be implemented by post processing device 57.

As shown in FIG. 9, the encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. The encoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in picture memory 64. For example, the encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by the decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 112, or archived for later transmission or retrieval by the decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In this manner, the encoding device 104 of FIG. 9 represents an example of a video encoder configured to generate syntax for a encoded video bitstream. The encoding device 104 may, for example, generate VPS, SPS, and PPS parameter sets as described above. The encoding device 104 may perform any of the techniques described herein, including the processes described above with respect to FIGS. 7 and 8. The techniques of this disclosure have generally been described with respect to the encoding device 104, but as mentioned above, some of the techniques of this disclosure may also be implemented by post processing device 57.

FIG. 10 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. The decoding device 112 may, in some examples, perform a decoding pass generally reciprocal to the encoding pass described with respect to the encoding device 104 from FIG. 9

During the decoding process, the decoding device 112 receives an encoded video bitstream that represents video blocks of an encoded video slice and associated syntax elements sent by the encoding device 104. In some examples, the decoding device 112 may receive the encoded video bitstream from the encoding device 104. In some examples, the decoding device 112 may receive the encoded video bitstream from a network entity 79, such as a server, a media-aware network element (MANE), a video editor/splicer, or other such device configured to implement one or more of the techniques described above. Network entity 79 may or may not include the encoding device 104. Some of the techniques described in this disclosure may be implemented by network entity 79 prior to network entity 79 transmitting the encoded video bitstream to the decoding device 112. In some video decoding systems, network entity 79 and the decoding device 112 may be parts of separate devices, while in other instances, the functionality described with respect to network entity 79 may be performed by the same device that comprises the decoding device 112.

The entropy decoding unit 80 of the decoding device 112 entropy decodes the bitstream to generate quantized coefficients, motion vectors, and other syntax elements. Entropy decoding unit 80 forwards the motion vectors and other syntax elements to prediction processing unit 81. The decoding device 112 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 104 during encoding of the video blocks to calculate interpolated values for sub-integer pixels of reference blocks. In this case, motion compensation unit 82 may determine the interpolation filters used by the encoding device 104 from the received syntax elements, and may use the interpolation filters to produce predictive blocks.

Inverse quantization unit 86 inverse quantizes, or dequantizes, the quantized transform coefficients provided in the bitstream and decoded by entropy decoding unit 80. The inverse quantization process may include use of a quantization parameter calculated by the encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 112 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 10 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as video destination device 122 shown in FIG. 1.

In the foregoing description, aspects of the application are described with reference to specific examples thereof, but those skilled in the art will recognize that the application is not limited thereto. Thus, while examples of the application have been described in detail herein, it is to be understood that the inventive concepts may be otherwise variously embodied and employed, and that the appended claims are intended to be construed to include such variations, except as limited by the prior art. Various features and aspects of the above-described examples may be used individually or jointly. Further, the describe examples can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate examples, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method of encoding, by an encoding device implemented in circuitry, video data, comprising:

obtaining the video data to encode;

determining, based on criteria implemented by the encoding device, whether any supplemental enhancement information (SEI) message associated with processing content of a coded video sequence (CVS) of a decoded video bitstream is considered essential to enable a desired user experience, wherein the decoded video bitstream would result from decoding of an encoded video bitstream associated with the video data;

based on a determination that a set of types of SEI messages within the CVS are considered, by the encoding device, to be essential:

generating a SEI message that includes information that indicates that the set of types of SEI messages within the CVS is determined, by the encoding device, to be essential to process content of the CVS to enable a desired user experience, where the set of types of SEI messages do not affect decoding of the encoded video bitstream;

generating, for inclusion within the SEI message, a first syntax element indicative of a number of types of SEI messages included within the set of types of SEI messages;

for each type of SEI message included within the set of types of SEI messages, generating, for inclusion within the SEI message, a second syntax element indicative of a type of SEI message;

including, within the SEI message, the first syntax element and the second syntax element;

encoding the video data to generate the encoded video bitstream; and transmitting the encoded video bitstream and the SEI message.

2. The method of claim 1, further comprising including, based on a requirement, the SEI message within a first access unit of the CVS.

3. The method of claim 1, further comprising including, based on a requirement, the SEI message in a current access unit and including the SEI message in each access unit from the current access unit to an end of the CVS.

4. The method of claim 1, further comprising defining, based on input received from a content producer, the criteria implemented by the encoding device.

5. The method of claim 1, further comprising:

encapsulating the encoded video bitstream for streaming, wherein the encoded video bitstream is encapsulated according to a streaming format; and generating, according to the streaming format, a description of encoded video bitstream, wherein the description includes the SEI message.

6. The method of claim 1, further comprising:
encapsulating the encoded video bitstream for transmission over a network, wherein the encoded video bitstream is encapsulated according to a container format;
generating, according to the container format, a first packet, wherein a payload portion of the first packet includes the SEI message as a descriptor; and
generating one or more packets including the encoded video bitstream, wherein the one or more packets follow the first packet in transmission order.

7. The method of claim 1, further comprising:
encapsulating the encoded video bitstream for transmission over a network, wherein the encoded video bitstream is encapsulated according to a real-time transfer protocol; and
generating, according to a session description protocol, a session description, wherein the session description includes the SEI message.

8. An encoding device, comprising:
a memory configured to store video data to encode; and
a processor implemented in circuitry and in communication with the memory, the processor configured to:
  determine, based on criteria implemented by the encoding device, whether any supplemental enhancement information (SEI) message associated with processing content of a coded video sequence (CVS) of a decoded video bitstream is considered essential to enable a desired user experience, wherein the decoded video bitstream would result from decoding of an encoded video bitstream associated with the video data;
  based on a determination that a set of types of SEI messages within the CVS are considered, by the encoding device, to be essential:
    generate a SEI message that includes information that indicates that the set of types of SEI messages within the CVS is determined, by the encoding device, to be essential to process content of the CVS to enable a desired user experience, where the set of types of SEI messages do not affect decoding of the encoded video bitstream;
    generate, for inclusion within the SEI message, a first syntax element indicative of a number of types of SEI messages included within the set of types of SEI messages;
    for each type of SEI message included within the set of types of SEI messages, generate, for inclusion within the SEI message, a second syntax element indicative of a type of SEI message;
    include, within the SEI message, the first syntax element and the second syntax element;
  encode the video data to generate the encoded video bitstream; and
  transmit the encoded video bitstream and the SEI message.

9. The encoding device of claim 8, wherein the processor is further configured to include, based on a requirement, the SEI message within a first access unit of the CVS.

10. The encoding device of claim 8, wherein the processor is further configured to include, based on a requirement, the SEI message in a current access unit and include the SEI message in each access unit from the current access unit to an end of the CVS.

11. The encoding device of claim 8, where the processor is further configured to define, based on input received from a content producer, the criteria implemented by the encoding device.

12. A non-transitory computer-readable medium comprising instructions that, when executed by one or more processors, cause the one or more processors to:
receive video data to encode;
determine, based on criteria implemented by the encoding device, whether any supplemental enhancement information (SEI) message associated with processing content of a coded video sequence (CVS) of a decoded video bitstream is considered essential to enable a desired user experience, wherein the decoded video bitstream would result from decoding of an encoded video bitstream associated with the video data;
based on a determination that a set of types of SEI messages within the CVS are considered, by the encoding device, to be essential:
  generate a SEI message that includes information that indicates that the set of types of SEI messages within the CVS is determined, by the encoding device, to be essential to process content of the CVS to enable a desired user experience, where the set of types of SEI messages do not affect decoding of the encoded video bitstream;
  generate, for inclusion within the SEI message, a first syntax element indicative of a number of types of SEI messages included within the set of types of SEI messages;
  for each type of SEI message included within the set of types of SEI messages, generate, for inclusion within the SEI message, a second syntax element indicative of a type of SEI message;
  include, within the SEI message, the first syntax element and the second syntax element;
encode the video data to generated the encoded video data; and
transmit the encoded video bitstream and the SEI message.

13. A method of decoding video data, comprising:
receiving, at a decoding device, an encoded video bitstream and a supplemental enhancement information (SEI) message associated with the encoded video bitstream;
processing the SEI message that includes information that indicates that a set of types of SEI messages within a coded video sequence (CVS) of the encoded video bitstream is determined, by an encoding device of the encoded video bitstream, to be essential to process content of the CVS to enable a desired user experience, where the set of types of SEI messages do not affect decoding of the encoded video bitstream;
receiving, within the SEI message, a first syntax element indicative of a number of types of SEI messages included within the set of types of SEI messages;
determining, based on the first syntax element, the number of types of SEI messages included within the set of types of SEI messages;
responsive to the determination of the number of types of SEI messages included within the set of types of SEI messages, for each type of SEI message included within the set of types of SEI messages, receiving a second syntax element indicative of a type of SEI message;
determining that each type of SEI message among the set of types of SEI messages have been determined, by the encoding device, to be essential to process content of the CVS to enable the desired user experience; and decoding the encoded video bitstream to generate decoded video data.

14. The method of claim 13, further comprising receiving the SEI message in a first access unit of the CVS.

15. The method of claim 13, further comprising receiving the SEI message in a current access unit and in each access unit from the current access unit to an end of the CVS.

16. The method of claim 13, further comprising, based on content of the SEI message, determining whether the decoding device includes system-level processing entities configured to process the CVS to provide enable the desired user experience.

17. The method of claim 13, wherein the encoded video bitstream and the SEI message associated with the encoded video bitstream are received in a file, wherein the file is formatted according to a file format, and wherein, according to the file format, the SEI message is in a part of the file that is read by the decoding device before a part of the file that includes the encoded video bitstream.

18. The method of claim 13, wherein the encoded video bitstream and the SEI message associated with the encoded video bitstream are received in a data stream, wherein the data stream is formatted according to a streaming format; and reading, from the data stream, a description of encoded video bitstream, wherein the description includes the SEI message.

19. The method of claim 13, wherein the encoded video bitstream and the SEI message associated with the encoded video bitstream are received in a plurality of network packets;

reading the SEI message from a payload portion of a first packet from the plurality of network packets; and reading the encoded video bitstream from one or more packets from the plurality of network packets, wherein the one or more packets follow the first packet in transmission order.

20. The method of claim 13, wherein the encoded video bitstream and the SEI message associated with the encoded video bitstream are received over a network, wherein the encoded video bitstream is encapsulated according to a real-time transfer protocol, wherein the SEI message is included in a session description, wherein the session description is formatted according to a session description protocol.

21. The method of claim 13 further comprising processing the decoded video data based on each type of SEI message included in the set of types of SEI messages.

22. A decoding device, comprising:
a memory configured to store an encoded video bitstream and a supplemental enhancement information (SEI) message associated with the encoded video bitstream; and
a processor implemented in circuitry and in communication with the memory, the processor configured to:
process the SEI message that includes information that indicates that a set of types of SEI messages within a coded video sequence (CVS) of the encoded video bitstream is determined, by an encoding device of the encoded video bitstream, to be essential to process content of the CVS to enable a desired user experience, where the set of types of SEI messages do not affect decoding of the encoded video bitstream;
receive, within the SEI message, a first syntax element indicative of a number of types of SEI messages included within the set of types of SEI messages;
determine, based on the first syntax element, the number of types of SEI messages included within the set of types of SEI messages;
responsive to the determination of the number of types of SEI messages included within the set of types of SEI messages, for each type of SEI message included within the set of types of SEI messages, receive a second syntax element indicative of a type of SEI message;
determine that each type of SEI message among the set of types of SEI messages have been determined, by the encoding device, to be essential to process content of the CVS to enable the desired user experience;
decode the encoded video bitstream to generate decoded video data.

23. The decoding device of claim 22, wherein the processor is further configured to receive the SEI message in a first access unit of the CVS.

24. The decoding device of claim 22, wherein the processor is further configured to receive the SEI message in a current access unit and in each access unit from the current access unit to an end of the CVS.

25. The decoding device of claim 22, wherein the decoding device is further configured to, based on content of the SEI message, determine whether the decoding device includes system-level processing entities configured to process the CVS to provide enable the desired user experience.

26. The decoding device of claim 22 wherein the processor is further configured to process the decoded video data based on each type of SEI message included in the set of types of SEI messages.

27. A non-transitory, computer-readable medium comprising instructions that, when executed by one or more processors, cause the one or more processors to:
receive an encoded video bitstream and a supplemental enhancement information (SEI) message associated with the encoded video bitstream;
process the SEI message that includes information that indicates that a set of types of SEI messages within a coded video sequence (CVS) of the encoded video bitstream is determined, by an encoding device of the encoded video bitstream, to be essential to process content of the CVS to enable a desired user experience, where the set of types of SEI messages do not affect decoding of the encoded video bitstream;
receive, within the SEI message, a first syntax element indicative of a number of types of SEI messages included within the set of types of SEI messages;
determine, based on the first syntax element, the number of types of SEI messages included within the set of types of SEI messages;
responsive to the determination of the number of types of SEI messages included within the set of types of SEI messages, for each type of SEI message included within the set of types of SEI messages, receive a second syntax element indicative of a type of SEI message;
determine that each type of SEI message among the set of types of SEI messages have been determined, by the encoding device, to be essential to process content of the CVS to enable the desired user experience;
decode the encoded video bitstream to generate decoded video data.

28. The non-transitory, computer-readable storage medium of claim 27, further comprising instructions that, when executed, cause the one or more processors to process the decoded video data based on each type of SEI message included in the set of types of SEI messages.

29. An apparatus, comprising:
  means for receiving an encoded video bitstream and a supplemental enhancement information (SEI) message associated with the encoded video bitstream;
  means for processing the SEI message that includes information that indicates that a set of types of SEI messages within a coded video sequence (CVS) of the encoded video bitstream is determined, by an encoding device of the encoded video bitstream, to be essential to process content of the CVS to enable a desired user experience, where the set of types of SEI messages do not affect decoding of the encoded video bitstream;
  means for receiving, within the SEI message, a first syntax element indicative of a number of types of SEI messages included within the set of types of SEI messages;
  means for determining, based on the first syntax element, the number of types of SEI messages included within the set of types of SEI messages;
  responsive to the determination of the number of types of SEI messages included within the set of types of SEI messages, for each type of SEI message included within the set of types of SEI messages, means for receiving a second syntax element indicative of a type of SEI message;
  means for determining that each type of SEI message among the set of types of SEI messages have been determined, by the encoding device, to be essential to process content of the CVS to enable the desired user experience;
  means for decoding the encoded video bitstream to generate decoded video data.

30. The apparatus of claim 29 further comprising means for processing the decoded video data based on each type of SEI message included in the set of types of SEI messages.

* * * * *